US009095926B2

(12) United States Patent
Okada et al.

(10) Patent No.: US 9,095,926 B2
(45) Date of Patent: Aug. 4, 2015

(54) FRICTION STIR SPOT WELDING DEVICE AND FRICTION STIR SPOT WELDING METHOD

(75) Inventors: Hideki Okada, Kakamigahara (JP); Hajime Kashiki, Kobe (JP); Kazumi Fukuhara, Aakashi (JP); Mitsuo Fujimoto, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 14/006,004

(22) PCT Filed: Mar. 16, 2012

(86) PCT No.: PCT/JP2012/001847
§ 371 (c)(1),
(2), (4) Date: Nov. 20, 2013

(87) PCT Pub. No.: WO2012/127833
PCT Pub. Date: Sep. 27, 2012

(65) Prior Publication Data
US 2014/0069986 A1    Mar. 13, 2014

(30) Foreign Application Priority Data
Mar. 18, 2011    (JP) .................................. 2011-060854

(51) Int. Cl.
B23K 20/12    (2006.01)

(52) U.S. Cl.
CPC ............. *B23K 20/122* (2013.01); *B23K 20/123* (2013.01); *B23K 20/1265* (2013.01)

(58) Field of Classification Search
None
See application file for complete search history.

(56) References Cited

U.S. PATENT DOCUMENTS

| 5,697,544 | A  | * | 12/1997 | Wykes ............................ 228/2.1 |
| 6,758,382 | B1 | * | 7/2004  | Carter ............................ 228/2.1 |
| 2002/0179682 | A1 | * | 12/2002 | Schilling et al. ........... 228/112.1 |
| 2006/0102689 | A1 | * | 5/2006  | Trapp et al. .................... 228/2.1 |
| 2006/0124691 | A1 | * | 6/2006  | Wood et al. .................... 228/2.1 |
| 2006/0169741 | A1 | * | 8/2006  | Smith et al. .................... 228/2.1 |
| 2006/0289604 | A1 | * | 12/2006 | Zettler et al. ................... 228/2.1 |

(Continued)

FOREIGN PATENT DOCUMENTS

JP    2006-167729 A  *  6/2006
JP    2006-167793 A  *  6/2006

(Continued)

OTHER PUBLICATIONS

Machine translation of JP-2010-269367A (no date available).*

(Continued)

*Primary Examiner* — Kiley Stoner
(74) *Attorney, Agent, or Firm* — Oliff PLC

(57) ABSTRACT

A tool driving section of a friction stir spot welding device is configured to advance and retract each of a pin member and a shoulder member. A tool driving control section is configured to control the tool driving section such that an absolute value of a tool average position Tx defined by a following equation:

$$Ap \cdot Pp + As \cdot Ps = Tx,$$

where Ap is a cross-section area of a front end surface of the pin member, As is a cross-section area of a front end surface of the shoulder member, Pp is a press-fit depth of the pin member press-fitted from a front surface of an object to be welded, and Ps is a press-fit depth of the shoulder member press-fitted from the front surface of the object to be welded, is small.

5 Claims, 12 Drawing Sheets

(56) References Cited

U.S. PATENT DOCUMENTS

| | | | |
|---|---|---|---|
| 2007/0057015 A1* | 3/2007 | Colligan | 228/2.1 |
| 2007/0228102 A1* | 10/2007 | Trapp et al. | 228/2.1 |
| 2008/0006677 A1* | 1/2008 | Kumagai et al. | 228/101 |
| 2008/0296350 A1* | 12/2008 | Henneboehle et al. | 228/112.1 |
| 2009/0236045 A1* | 9/2009 | Burton et al. | 156/349 |
| 2009/0308913 A1* | 12/2009 | Hall et al. | 228/112.1 |
| 2010/0084456 A1* | 4/2010 | Carter | 228/112.1 |
| 2010/0163604 A1* | 7/2010 | Noe et al. | 228/114 |
| 2012/0267419 A1* | 10/2012 | Blaski et al. | 228/2.1 |
| 2012/0279043 A1* | 11/2012 | Carter | 29/525.05 |

FOREIGN PATENT DOCUMENTS

| | | | |
|---|---|---|---|
| JP | 2006-239720 A * | 9/2006 | |
| JP | 2006-297434 A * | 11/2006 | |
| JP | A-2007-30017 | 2/2007 | |
| JP | 2008-030050 A * | 2/2008 | |
| JP | B2-4252403 | 4/2009 | |
| JP | A-2010-269367 | 12/2010 | |
| MY | WO 2012/026800 A1 * | 3/2012 | |
| NO | WO 01/28732 A1 * | 4/2001 | |

OTHER PUBLICATIONS

Jun. 19, 2012 International Search Report issued in International Patent Application No. PCT/JP2012/001847.

Aug. 20, 2014 Office Action issued in Canadian Patent Application No. 2,829,738.

* cited by examiner

FIG. 10
FIG. 10A
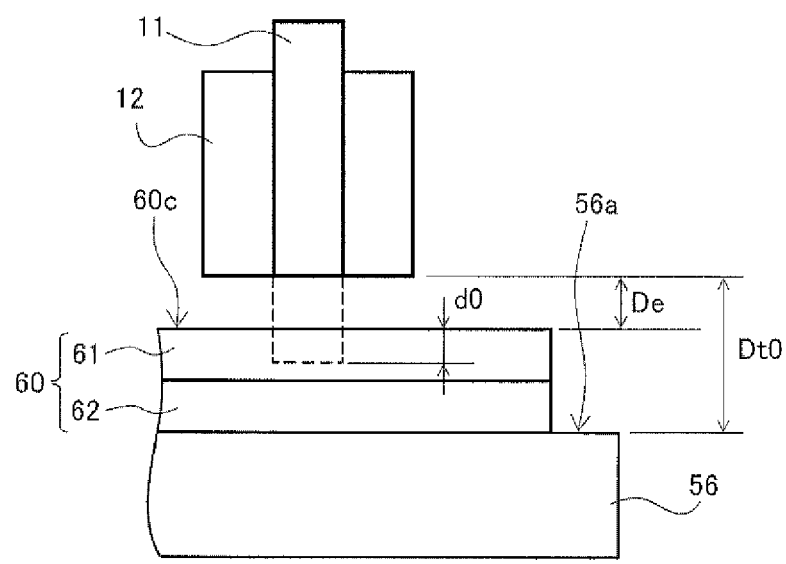
FIG. 10B
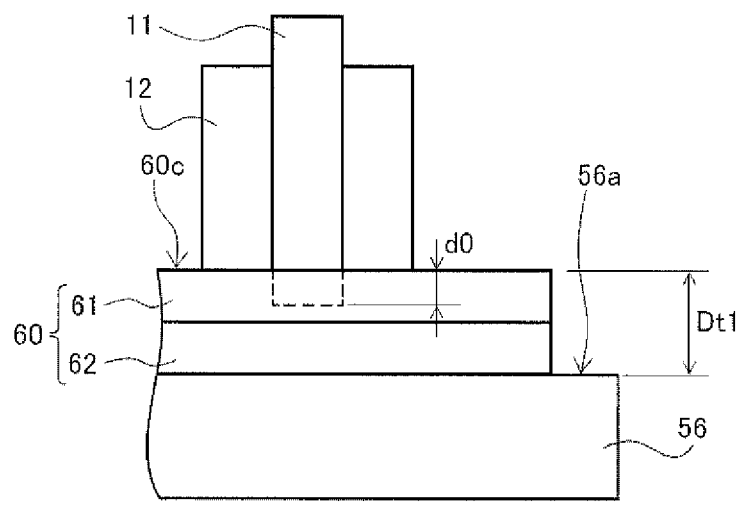

US 9,095,926 B2

FRICTION STIR SPOT WELDING DEVICE AND FRICTION STIR SPOT WELDING METHOD

TECHNICAL FIELD

The present invention relates to a friction stir spot welding device and a friction stir spot welding method, and in particular, to a friction stir spot welding device and a friction stir spot welding method that can preferably control advancement and retraction of a rotating tool for friction stir spot welding.

BACKGROUND ART

In transport means such as automobiles, railroad vehicles and airplanes, resistance spot welding or rivet connection has been employed to couple metal materials to each other. However, in recent years, attention has been given to friction stir spot welding as disclosed in Patent Document 1 or 2. According to friction stir spot welding, the metal materials are welded to each other by friction heat with a cylindrical rotating tool (welding tool) having a pin member at its front end. The rotating tool is configured to advanceable and retractable with respect to an object to be welded, and advances at a pressure or speed in a predetermined range while rotating at high speed to be pushed into (press-fitted into) the object to be welded (metal materials). The metal materials are softened at a site where the rotating tool is press-fitted, and the softened metal materials are stirred to weld the object to be welded.

The friction stir spot welding disclosed in Patent Document 1 uses only the pin member as the rotating tool and thus, for convenience of description, will be referred to as single-acting friction stir spot welding. On the other hand, the friction stir spot welding disclosed in Patent Document 2 uses a substantially cylindrical pin member and a substantially tubular shoulder member having a hollow for inserting the pin member thereinto as the rotating tool, and the pin member and the shoulder member can independently rotate, and advance and retract. For convenience of description, the friction stir spot welding of such configuration will be referred to as double-acting friction stir spot welding (refill friction spot joining). According to the double-acting friction stir spot welding, by adjusting timings of advancement and retraction of the pin member and the shoulder member, a recess formed by press-fitting of the pin member can be backfilled.

PRIOR ART DOCUMENTS

Patent Documents

Patent Document 1: Patent Publication No. 4252403
Patent Document 2: Japanese Patent Laid-Open Publication No. 2007-30017

SUMMARY OF THE INVENTION

Problems to be Solved by the Invention

According to the double-acting friction stir spot welding, the rotating tool consists of a plurality of members: the pin member and the shoulder member. Thus, as compared to the single-acting friction stir spot welding, the double-acting friction stir spot welding has more considerations at execution, and it is more difficult to select matters to be controlled at execution and moreover, if the selection is possible, it is more difficult to specifically determine the matters to be controlled. For this reason, a method of controlling the single-acting friction stir spot welding as disclosed in Patent Document 1 cannot be applied as-is to the double-acting friction stir spot welding.

Patent Document 2 describes the double-acting friction stir spot welding capable of preventing or effectively suppressing irregular burrs, but does not disclose the above-mentioned control that can achieve excellent welding quality satisfying welding conditions with high precision.

Studies of the present inventor show that, in the double-acting friction stir spot welding, when the recess formed by press-fit of the pin member or the shoulder member is backfilled, an internal cavity defect occurs. Determining whether or not the internal cavity defect occurs requires ultrasonic flaw detection testing, cross-section observation, or so on, which may decreases the efficiency of welding operations as well as increases costs. However, any technique of preventing or effectively suppressing the internal cavity defect has not been known.

The present invention is made to solve such problem, and its object is to provide a control technique capable of achieving the excellent welding quality at suitable precision according to welding conditions, and preventing or suppressing the internal cavity defect, especially in double-acting friction stir spot welding.

Solutions to the Problems

In order to achieve the above-described object, the friction stir spot welding device according to the present invention is a friction stir spot welding device that welds an object to be welded by partial stirring of a rotating tool, the device including: a cylindrical pin member as the rotating tool, the pin member configured to rotate about an axis and be advanceable and retractable in the axial direction; a tubular shoulder member configured to surround the pin member, rotate coaxially with the pin member, and be advanceable and retractable in the axial direction; a tool driving section configured to cause each of the pin member and the shoulder member to advance and retract along the axis; and a tool driving control section configured to control the action of the tool driving section, wherein the tool driving control section controls the tool driving section such that an absolute value of a tool average position Tx defined as a following equation:

$$Ap \cdot Pp + As \cdot Ps = Tx,$$

where Ap is a cross-section area of a front end surface of the pin member, As is a cross-section area of a front end surface of the shoulder member, Pp is a press-fit depth of the pin member press-fitted from a front surface of the object to be welded, and Ps is a press-fit depth of the shoulder member press-fitted from the front surface of the object to be welded, is small.

In the friction stir spot welding device having the above-described configuration, the tool driving control section controls the tool driving section such that the tool average position Tx is substantially 0.

The friction stir spot welding device having the above-described configuration, further includes a press-fit reference point setting section configured to set a position where the shoulder member contacts the object to be welded, as a press-fit reference point, and the tool driving control section may be configured to control the press-fit depth of the shoulder member or the pin member on the basis of the press-fit reference point set by the press-fit reference point setting section.

The friction stir spot welding device having the above-described configuration further includes a displacement calculating section configured to calculate quantity of displacement as displacement of a front end of the pin member or the shoulder member, and the tool driving control section may be configured to correct the press-fit depth with the quantity of displacement.

In order to achieve the above-described object, the friction stir spot welding method according to the present invention is a friction stir spot welding method using a cylindrical pin member as the rotating tool, the pin member configured to rotate about an axis and be advanceable and retractable in the axial direction, and a tubular shoulder member configured to surround the pin member, rotate coaxially with the pin member, and be advanceable and retractable in the axial direction, in a state where the pin member and the shoulder member are advanceable and retractable, to weld an object to be welded having a front surface facing the pin member and the shoulder member by partial stirring, wherein advancement and retraction of the pin member and the shoulder member is controlled such that an absolute value of a tool average position Tx defined as a following equation:

$$Ap \cdot Pp + As \cdot Ps = Tx,$$

where Ap is a cross-section area of a front end surface of the pin member, As is a cross-section area of a front end surface of the shoulder member, Pp is a press-fit depth of the pin member press-fitted from a front surface of the object to be welded, and Ps is a press-fit depth of the shoulder member press-fitted from the front surface of the object to be welded, is small.

In the friction stir spot welding method having the above-described configuration, advancement and retraction of the pin member and the shoulder member may be controlled such that the tool average position Tx is substantially 0 by the tool driving control section.

In the friction stir spot welding method having the above-described configuration, wherein a position where the shoulder member contacts the object to be welded may be set as a press-fit reference point, and the press-fit depth of the shoulder member or the pin member may be controlled on the basis of the press-fit reference point.

In the friction stir spot welding method having the above-described configuration, quantity of displacement as displacement of a front end of the pin member or the shoulder member may be calculated, and the press-fit depth may be corrected with the quantity of displacement.

The above-mentioned and other objects, features, and advantages of the present invention will be apparent from following detailed description of preferred Embodiments with reference to appended figures.

Effects of the Invention

As described above, the present invention advantageously provides the control technique capable of achieving the excellent welding quality at suitable precision according to welding conditions, and preventing or suppressing the internal cavity defect, especially in double-acting friction stir spot welding.

BRIEF DESCRIPTION OF THE DRAWINGS

FIG. 10A and FIG. 10B are schematic views for describing setting of a press-fit reference point in the friction stir spot welding device in FIG. 7.

EMBODIMENTS OF THE INVENTION

Preferred Embodiments of the present invention will be described below with reference to figures. Throughout the figures, the same or equivalent elements are given the same reference signs and overlapping description thereof is omitted.

(Embodiment 1)
[Friction Stir Spot Welding Device]

A basic configuration of a friction stir spot welding device in accordance with Embodiment 1 of the present invention will be described with reference to FIG. 1.

Figure 1:
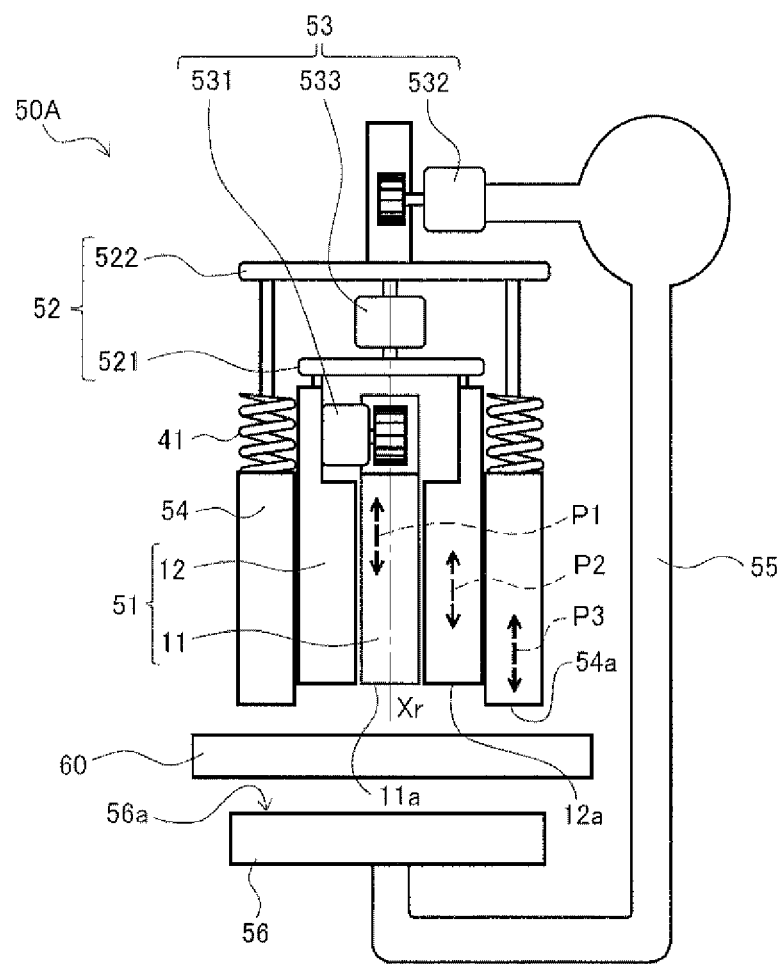
FIG. 1 is a schematic side view showing an example of configuration of a friction stir spot welding device in accordance with Embodiment 1 of the present invention.

As shown in FIG. 1, a friction stir spot welding device 50A in accordance with this embodiment includes a rotating tool 51, a tool fixing section 52, a tool driving section 53, a clamp member 54, a lining support section 55, and a lining member 56.

The rotating tool 51 is supported by the tool fixing section 52, and driven to advance and retract and rotate by the tool driving section 53. The rotating tool 51, the tool fixing section 52, the tool driving section 53, and the clamp member 54 are provided above the lining support section 55 constituted as a C-gun (C-type frame), and the lining member 56 is provided below the lining support section 55. Accordingly, the rotating tool 51 and the lining member 56 are attached to the lining support section 55 as opposed to each other, and an object to be welded 60 is arranged between the lining member 56 and the rotating tool 51.

The rotating tool 51 consists of a pin member 11 and a shoulder member 12. The tool fixing section 52 consists of a rotating tool fixing section 521 and a clamp fixing section 522, and the tool driving section 53 consists of a pin driving section 531, a shoulder driving section 532, a rotational driving section 533, and a clamp driving section 41. The clamp member 54 is fixed to the clamp fixing section 522 via the clamp driving section 41. The clamp driving section 41 is formed of a spring.

The pin member 11 is substantially tubular or cylindrical, and although not shown in detail, is supported by the rotating tool fixing section 521. The pin member 11 is rotated about an axis Xr (a rotary axis represented by a dot-and-dash line in the figure) by the rotational driving section 533, and can be advanced and retracted along a dashed arrow P1 or the axis Xr (in the vertical direction in FIG. 1) by the pin driving section 531. The shoulder member 12 is shaped substantially like a hollow tube, and the pin member 11 is inserted into the hollow tube, so that the rotating tool fixing section 521 supports the shoulder member 12 outside the pin member 11 so as to surround the pin member 11. The shoulder member 12 is rotated about the same axis Xr as the rotary axis of the pin member 11 by the rotational driving section 533, and can be advanced and retracted along a dashed arrow P2 or the axis Xr by the shoulder driving section 532.

In this manner, both of the pin member 11 and the shoulder member 12 are supported by the rotating tool fixing section 521 in this embodiment, and are integrally rotated about the axis Xr by the rotational driving section 533. Further, the pin member 11 and the shoulder member 12 each can be advanced and retracted along the axis Xr by the pin driving section 531 and the shoulder driving section 532. With the configuration shown in FIG. 1, the pin member 11 can advance and retract alone and with advancement and retraction of the shoulder member 12; however, the pin member 11 and the shoulder member 12 can independently advance and retract.

The clamp member 54 is provided outside the shoulder member 12, and like the shoulder member 12, is shaped substantially like a hollow tube, and the shoulder member 12 is inserted into the hollow. Accordingly, the substantially tubular shoulder member 12 is located on the periphery of the pin member 11, and the substantially tubular clamp member 54 is located on the periphery of the shoulder member 12. In other words, the clamp member 54, the shoulder member 12, and the pin member 11 are coaxially nested.

The clamp member 54 presses the object to be welded 60 from one surface (front surface), and in this embodiment, is supported by the clamp fixing section 522 via the clamp driving section 41. Accordingly, the clamp member 54 is biased toward the lining member 56. The clamp fixing section 522 supports the rotating tool fixing section 521 via the rotational driving section 533. The clamp fixing section 522 can be advanced and retracted along a dashed arrow P3 (having the same directions as those of the dashed arrows P1 and P2) by the shoulder driving section 532. The clamp driving section 41 is not limited to the spring, and may be any means for biasing or pressurizing force the clamp member 54, for example, a mechanism using gas pressure, hydraulic pressure, or servo motor. The clamp driving section 41 may be advanced and retracted by the shoulder driving section 532 as shown in FIG. 1, or may be independently advanced and retracted irrespective of the shoulder driving section 532.

As described above, the rotating tool 51, the tool fixing section 52, the tool driving section 53, and the clamp member 54 are provided on the lining support section 55 as opposed to the lining member 56. The pin member 11 and the shoulder member 12, which constitute the rotating tool 51, and the clamp member 54 include a contact surface 11a, a contact surface 12a, and a contact surface 54a, respectively, and these contact surfaces 11a, 12a, 54a can be advanced and retracted by the tool driving section 53, and contact a front surface (first surface, one surface) of the object to be welded 60 arranged between the contact surfaces and the lining member 56. The lining member 56 is opposed to the pin member 11 and the shoulder member 12, and the clamp member 54, and contacts a back surface of the object to be welded 60. In FIG. 1, the lining member 56 has a flat surface that conforms to the back surface of the flat plate-like object to be welded 60.

The lining member 56 is located on the side, toward which the pin member 11 and the shoulder member 12 advance, and a support surface 56a of the lining member 56 supports the back surface of the object to be welded 60 in the state where the front surface of the object to be welded 60 faces the pin member 11 and the shoulder member 12. The lining member 56 may be configured in any manner as long as it can properly support the object to be welded 60 for friction stir spot welding. The lining member 56 is generally a flat plate having the support surface 56a that can stably support the plate-like object to be welded 60, but may have any configuration other than the flat plate according to the shape of the object to be welded 60. For example, the lining members 56 of plural different shapes may be prepared separately, and the lining member 56 may be removable from the lining support section 55 to be replaced with one of the prepared lining members 56 according to the type of the object to be welded 60.

Specific configurations of the rotating tool 51, the tool fixing section 52, and the tool driving section 53 in this embodiment are not limited to the above-mentioned configurations, and may be any configuration well known in the field of friction stir spot welding. For example, the pin driving section 531, the shoulder driving section 532, and the rotational driving section 533, which constitute the tool driving section 53 in this embodiment, each are formed of a motor and gear mechanism well known in the field of friction stir spot welding. In the friction stir spot welding device 50A, the clamp member 54 may be omitted, or may be removable from the lining support section 55 as needed. Other members not shown in FIG. 1 may be included.

The lining support section 55 is formed of a C-gun in this embodiment, but is not limited to this as long as it can support the pin member 11 and the shoulder member 12 so as to allow them to advance and retract, as well as support the lining member 56 at a position opposed to the rotating tool 51.

In this embodiment, the lining support section 55 is attached to a front end of an arm not shown. The arm is included in a friction stir spot welding robot not shown in FIG. 1. Thus, the lining support section 55 can be deemed to be included in the friction stir spot welding robot. The configuration of the friction stir spot welding robot, including the lining support section 55 and the arm, is not specifically limited, and any configuration well known in the field of the friction stir spot welding, such as a multiple-joint robot, can be preferably used.

The friction stir spot welding device 50A including the lining support section 55 is not applied only to the friction stir spot welding robot. For example, the friction stir spot welding device 50A can be preferably applied to well-known processing machines such as NC machine tools, large C frames, and auto-riveters. Two pairs or more of robots may be used such that the friction stir spot welding device confronts the lining member 56. Providing that the object to be welded 60 can be stably subjected to friction stir spot welding, a friction stir spot welding device can be applied as a handheld configuration in contrast with the stationary friction stir spot welding device 50A in this embodiment, or a robot can be used as a positioner for the object to be welded 60.

[Friction Stir Spot Welding Method]

Next, a specific process of a friction stir spot welding method using the above-mentioned friction stir spot welding device 50A will be described with reference to FIG. 2A to FIG. 2F and FIG. 3A to FIG. 3F. In FIG. 2A to FIG. 2F and FIG. 3A to FIG. 3F, two metal plates 61, 62 are used as the object to be welded 60, and these metal plates 61, 62 are stacked and coupled to each other by spot welding.

In FIG. 2A to FIG. 2F and FIG. 3A to FIG. 3F, an arrow p represents a direction in which the rotating tool 51 is moved (corresponding to the direction represented by the dashed arrow P1 to P2 in FIG. 1), an arrow r represents a direction in which the rotational members (the pin member 11 and the shoulder member 12) are rotated, and a block arrow F represents a direction in which a force is exerted on the metal plates 61, 62. In FIG. 2A to FIG. 3F and FIG. 3A to FIG. 3F, for clearly describing the position of the constituents in each step and the welding site of the metal plates 61, 62, as to the arrow p and the block arrow F, the reference numerals "p" and "F" are expressed in only FIG. 2A, and as to the arrow r, the reference numeral "r" is expressed in only FIG. 2B. Although a force is exerted also from the lining member 56 to the metal plates 61, 62, for convenience of description, the force is not shown in FIG. 2A to FIG. 2F. Further, to distinguish the shoulder member 12 from the pin member 11 and the clamp member 54, the shoulder member 12 is halftone-hatched.

First, a series of steps in FIG. 2A to FIG. 2F will be described. In the series of steps, the pin member 11 is press-fitted into the metal plates 61, 62 before the shoulder member 12 is.

Figure 2A:
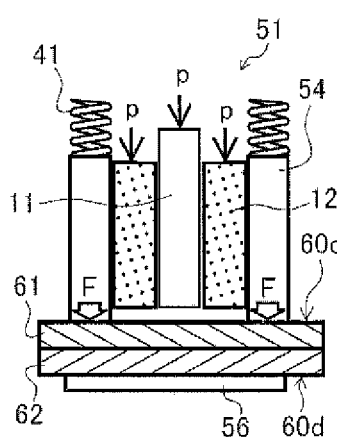
FIG. 2A to FIG. 2F are process charts schematically showing an example of each stage of friction stir spot welding by the friction stir spot welding device in FIG. 1.

Specifically, as shown in FIG. 2A, the rotating tool 51 is made close to the metal plates 61, 62 (the arrow p in this figure) to bring the contact surface 54a (not shown in FIG. 2A to FIG. 2F) of the clamp member 54 into contact with a front surface 60c of the upper metal plate 61, and to bring the lining member 56 into contact with a back surface 60d of the lower metal plate 62. As a result, the clamp member 54 and the lining member 56 sandwich the metal plates 61, 62 therebetween, and pressure from the clamp member 54 (the block arrow F in this figure) generates a clamping force.

Figure 2B:
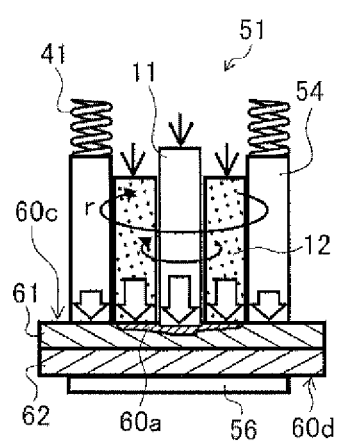

Next, as shown in FIG. 2B, the rotational members of the rotating tool 51 come close to the metal plates 61, 62, bringing the contact surface 11a (not shown in FIG. 2A to FIG. 2F) of the pin member 11 and the contact surface 12a (not shown in FIG. 2A to FIG. 2F) of the shoulder member 12 into contact with the front surface 60c of the metal plate 61. In this state, contraction of the clamp driving section 41 formed of the spring generates the clamping force of the clamp member 54. Then, the pin member 11 and the shoulder member 12 are brought into contact with the front surface 60c of the metal plate 61, and are rotated (about the arrow r in this figure).

In this state, since both of the pin member 11 and the shoulder member 12 do not advance nor retract, the front surface 60c of the metal plate 61 is "preheated". Thereby, the metal material in a contact area of the metal plate 61 is softened by heat generated by friction, forming a plastic flowing portion 60a near the front surface 60c of the metal plate 61.

Figure 2C:
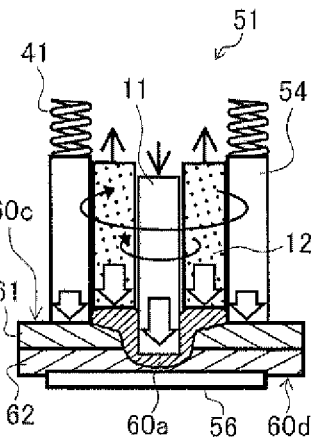

Next, as shown in FIG. 2C, the pin member 11 is projected from the shoulder member 12 by the pin driving section 531 not shown, thereby further advancing (pressing) the pin member 11 inwards from the front surface 60c of the metal plate 61. At this time, the softened region of the metal material ranges from the upper metal plate 61 to the lower metal plate 62 to increase the plastic flowing portion 60a. Since the softened metal material of the plastic flowing portion 60a is further pushed aside by the pin member 11 and flows from immediately below the pin member 11 to immediately below the shoulder member 12, the shoulder member 12 retracts and floats upward when viewed from the pin member 11.

Figure 2D:
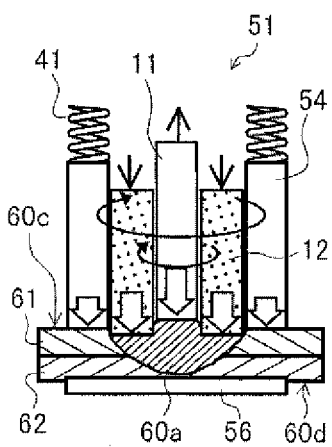

Next, as needed, as shown in FIG. 2D, a step where the pin member 11 protruded by the pin driving section 531 not shown is gradually retracted (drawn), and with the retraction of the pin member 11, the shoulder member 12 is advanced into (press-fitted into) the metal plate 61 may be performed. In a below-mentioned step in FIG. 2E, the front surface 60c of the metal plate 61 is shaped. However, if the front surface 60c is not sufficiently shaped at this time, the step shown in FIG. 2D may be performed.

After that, after the step in FIG. 2C, the pin member 11 is gradually retracted, and after the step in FIG. 2D, the shoulder member 12 is gradually retracted. At this time, as represented by the block arrows in FIG. 2C and FIG. 2D, even during retraction of the pin member 11 or the shoulder member 12, the pressurizing force from its front end is maintained. In the former case, since rotation and pressure of the shoulder member 12 is maintained while the pin member 11 is retracted, the softened metal material of the plastic flowing portion 60a flows from immediately below the shoulder member 12 to immediately below the pin member 11, backfilling the recess. In the latter case, since rotation and pressure by the pin member 11 is maintained while the shoulder member 12 is retracted, the recess caused by press-fit of the shoulder member 12 is backfilled.

Figure 2E:
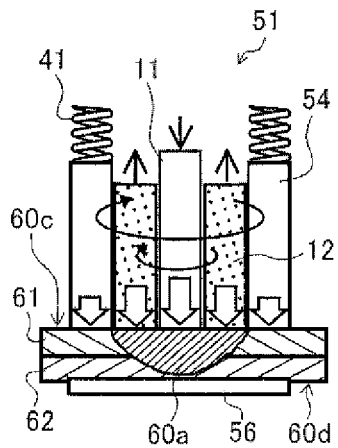

After that, as shown in FIG. 2E, the contact surface 11a of the pin member 11 is aligned with (flush with) the contact surface 12a of the shoulder member 12 without any substantial step therebetween. Thereby, the front surface 60c of the metal plate 61 is shaped to achieve an almost flat surface without any substantial recess.

Figure 2F:
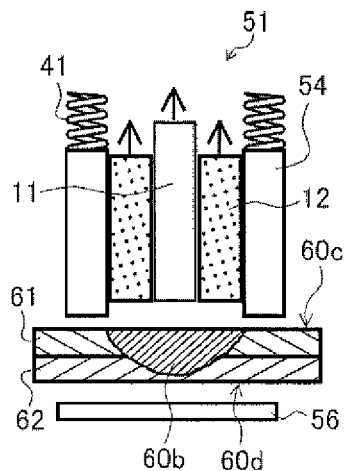

Finally, as shown in FIG. 2F, the rotating tool 51 and the lining member 56 are separated from the metal plates 61, 62 to finish the series of friction stir spot welding. At this time, rotation (and pressure) caused by contact with the rotating tool 51 is no longer transmitted to the metal plates 61, 62. Thus, plastic flow of the plastic flowing portion 60a extending on both the metal plates 61, 62 is stopped, and becomes a welded portion 60b. As a result, the two metal plates 61, 62 are coupled to each other with the welded portion 60b.

Next, a series of steps in FIG. 3A to FIG. 3F will be described. In the series of steps, the shoulder member 12 is press-fitted into the metal plates 61, 62 before the pin member 11 is. In FIG. 3A to FIG. 3F, the lining member 56 also exerts a force to the metal plates 61, 62, but for convenience of description, the force is not shown.

Figure 3A:
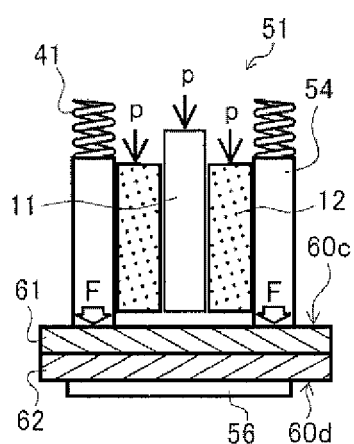
FIG. 3A to FIG. 3F are process charts schematically showing another example of each stage of friction stir spot welding by the friction stir spot welding device in FIG. 1.
Figure 3B:
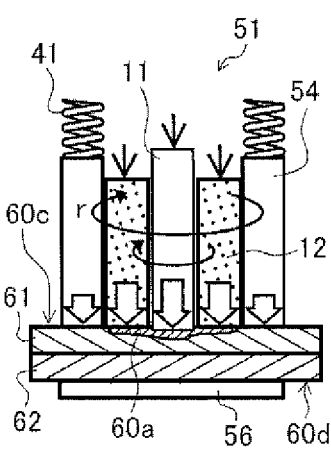
Figure 3C:
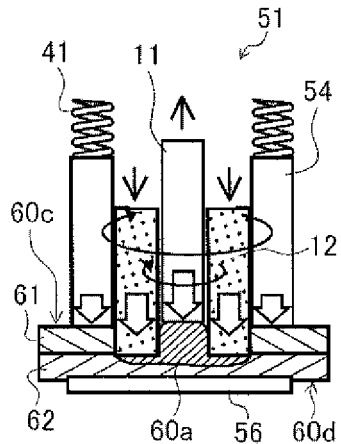

Since steps in FIG. 3A and FIG. 3B are the same as the steps in FIG. 2A and FIG. 2B, description thereof is omitted. Next, as shown in FIG. 3C, by protruding the shoulder member 12 further from the pin member 11 by the shoulder driving section 532 not shown, the shoulder member 12 is further advanced inwards (press-fitted into) from the front surface 60c of the metal plate 61. Thus, the plastic flowing portion 60a ranges from the upper metal plate 61 to the lower metal plate 62, the softened metal material of the plastic flowing portion 60a is pushed aside by the shoulder member 12 to flow from immediately below the shoulder member 12 to immediately below the pin member 11, resulting in that the pin member 11 retracts and floats upward when viewed from the shoulder member 12.

Figure 3D:
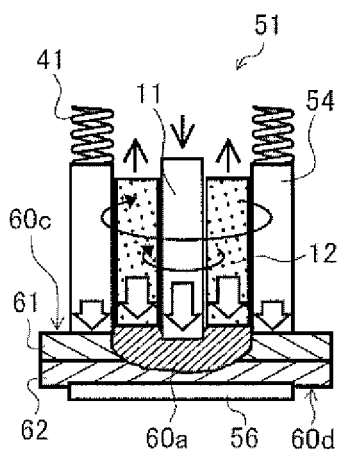

Next, as needed, as shown in FIG. 3D, a step where the protruding shoulder member 12 is gradually retracted (drawn), and with the retraction, the pin member 11 is advanced (press-fitted) into the metal plate 61 may be performed. Then, after the step in FIG. 3C, the shoulder member 12 is gradually retracted, and after the step in FIG. 3D, the pin member 11 is gradually retracted. This backfills the recess generated by press-fit of the shoulder member 12 or the pin member 11.

Figure 3E:
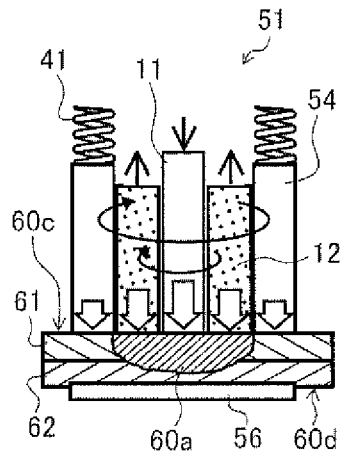
Figure 3F:
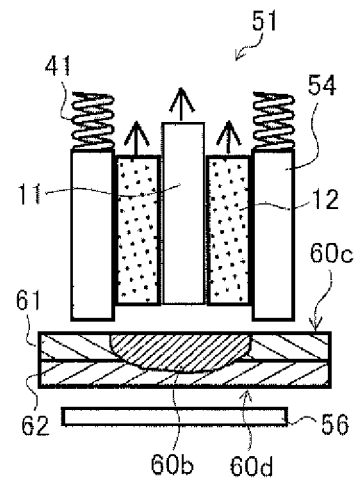

After that, as shown in FIG. 3E, the contact surface 11a of the pin member 11 is aligned with (flush with) the contact surface 12a of the shoulder member 12 without any substantial step therebetween. Finally, as shown in FIG. 3F, the rotating tool 51 and the lining member 56 are separated from the metal plates 61, 62 to finish the series of friction stir spot welding.

In this embodiment, the stage shown in FIG. 2A or FIG. 3A is referred to as a "preparation stage" of friction stir spot welding, the stage in FIG. 2B or FIG. 3B is referred to as a "pre-heating stage". In the stage shown in FIG. 2C to FIG. 2E or FIG. 3C to FIG. 3E, a press-fit depth of the pin member 11 or the shoulder member 12 is controlled by controlling the relative position of the pin member 11 with respect to the shoulder member 12 (or the relative position of the shoulder member 12 with respect to the pin member 11). Accordingly, these stages are referred to as a "tool control stage". The stage shown in FIG. 2F or FIG. 3F is referred to as a "completion stage" of friction stir spot welding.

In this embodiment, as the "tool control stage", three stages in total: a stage in FIG. 2C or FIG. 3C, a stage in FIG. 2D or FIG. 3D, and a stage in FIG. 2E or FIG. 3E are executed. For convenience of description, each of these stages is given a specific stage name. Specifically, the stage in FIG. 2C or FIG. 3C is referred to as a "press-fit stage", the stage in FIG. 2D or FIG. 3D is referred to as a "backfill stage", and the stage in FIG. 2E or FIG. 3E is referred to as a "shaping stage".

In this embodiment, the press-fit stage, the backfill stage, and the shaping stage are illustrated as the tool control stage and however, as described above, the tool control stage may be at least the press-fit stage and the shaping stage. The backfill stage is the tool control stage performed as needed and thus, may be omitted. A tool control stage including four or more stages is possible.

As described above, the friction stir spot welding device 50A includes the pin member 11 and the shoulder member 12 as the rotating tool 51, and the rotating tool 51 partially stirs the object to be welded 60 (the metal plates 61, 62 in this example) to weld the object to be welded 60. Since the two members of the rotating tool 51 can consecutively perform the stages shown in FIG. 2A to FIG. 2F or FIG. 3A to FIG. 3F, as compared to single-acting friction stir spot welding, irregularity in the front surface 60c of the object to be welded 60 can be reduced as much as possible by backfilling of the recess.

[Control Configuration of Friction Stir Spot Welding Device]

Next, control configuration of the friction stir spot welding device 50A, which serves to perform the series of stages in friction stir spot welding, will be specifically described with reference to FIG. 4.

Figure 4:
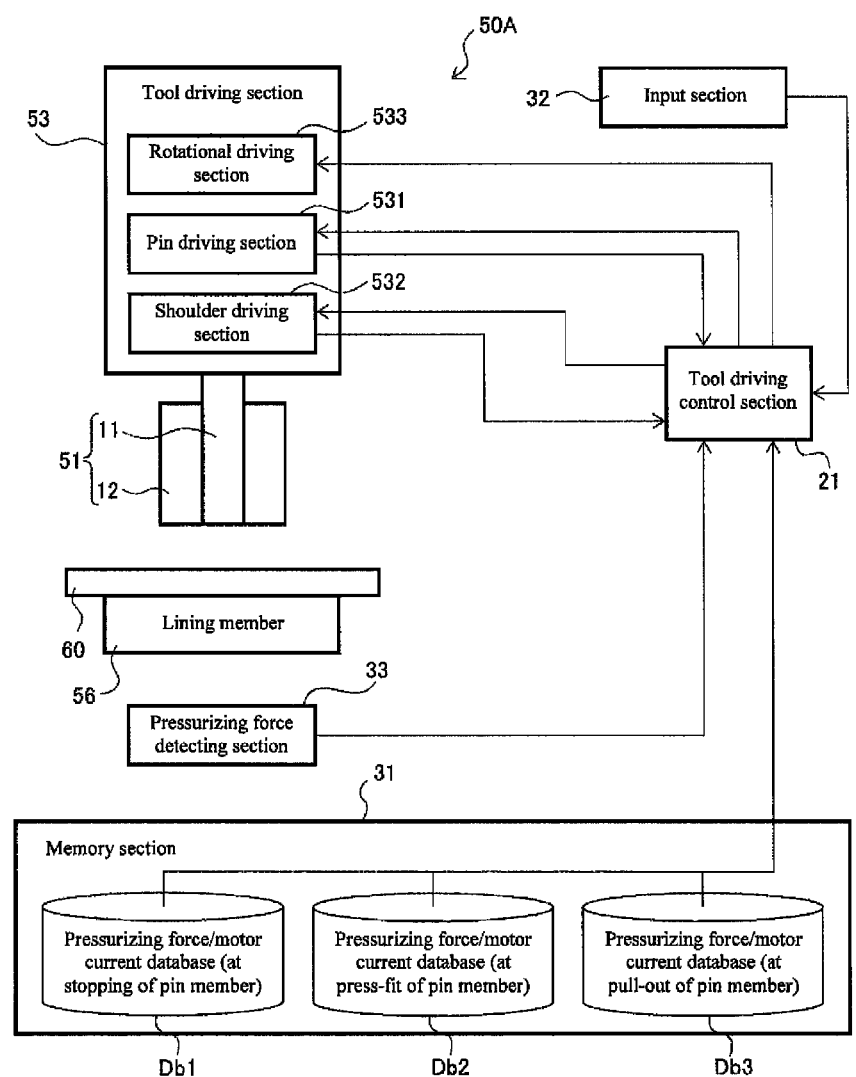
FIG. 4 is a block diagram showing functional configuration of the friction stir spot welding device in FIG. 1.

As shown in FIG. 4, the friction stir spot welding device 50A further includes a tool driving control section 21, a memory section 31, an input section 32, and a pressurizing force detecting section 33.

The tool driving control section 21 controls the tool driving section 53. That is, the tool driving control section 21 controls the pin driving section 531, the shoulder driving section 532, and the rotational driving section 533, which constitute the tool driving section 53, thereby controlling switching between advancement and retraction of the pin member 11 and the shoulder member 12, and the position of front ends, the moving speed, and the moving direction of the pin member 11 and the shoulder member 12 during advancement and retraction.

In this embodiment, the tool driving control section 21 controls the tool driving section 53 on the basis of a relational expression of the cross-section area (basal area) of the front end surface of the rotating tool 51 and the press-fit depth (press-fit/pull-out depth or advance/retract depth) of the rotating tool 51, thereby controlling the position of the front ends of the pin member 11 and the shoulder member 12. The specific configuration of the tool driving control section 21 is not especially limited, and in this embodiment, the tool driving control section 21 is formed of a CPU in a microcomputer, and calculates the operation of the tool driving section 53.

The memory section 31 readably stores various types of data, and in this embodiment, as shown in FIG. 4, stores pressurizing force/motor current databases Db1 to Db3. The tool driving control section 21 uses the pressurizing force/motor current databases Db1 to Db3 to control the tool driving section 53.

The memory section 31 is formed of a storage device such as a well-known memory, a hard disc, or the like. The memory section 31 is not necessarily a single unit, and may be formed of a plurality of storage devices (for example, a random access memory and a hard disc drive). When the tool driving control section 21 is a microcomputer, at least a part of the memory section 31 may be configured as an internal memory in the microcomputer, or as an independent memory. The memory section 31 may store data other than the databases, and read the data from any section other than the tool driving control section 21. As a matter of course, data may be written from the tool driving control section 21 or so on.

The input section 32 enables inputting of various parameters on the control of friction stir spot welding and other data into the tool driving control section 21, and is formed of a well-known input device such as a keyboard, a touch panel, or a button switch. In this embodiment, at least welding conditions for the object to be welded 60, for example, data on the thickness and the material of the object to be welded 60 can be inputted by the input section 32.

When the rotating tool 51 (the pin member 11, the shoulder member 12, or the both) contacts or is press-fitted into the object to be welded 60, the pressurizing force detecting section 33 detects the pressurizing force exerted on the object to be welded 60 from the rotating tool 51. In this embodiment, a load cell is used as the pressurizing force detecting section 33. However, the pressurizing force detecting section 33 is not limited to the load cell, and may be any well-known pressurizing force detector.

It is noted that, in the friction stir spot welding device 50A in accordance with Embodiment 1, the pressurizing force detecting section 33 is not essential constitute, but can be used to acquire the pressurizing force/motor current databases Db1 to Db3 stored in the memory section 31, enhancing convenience in controlling driving of the rotating tool 51. In the tool driving control section 21, the pressurizing force detecting section 33 may be used for feedback control from the pressurizing force detecting section 33 in place of the pressurizing force/motor current databases Db1 to Db3.

In this embodiment, more preferably, the tool driving control section 21 controls the tool driving section 53 such that a certain relational expression between the cross-section area of the front end surfaces of the pin member 11 and the shoulder member 12 and the press-fit depth of the pin member 11 and the shoulder member 12 is satisfied while the pin member 11 and the shoulder member 12 contact the object to be welded 60. Specifically, given that Ap is the cross-section area of the front end surface of the pin member 11, As is the cross-section area of the front end surface of the shoulder member 12, Pp is the press-fit depth of the pin member 11, and Ps is the press-fit depth of the shoulder member 12, the tool driving control section 21 controls the tool driving section 53 so as to make an absolute value of a tool average position Tx defined according to a following equation (I) small:

$$Ap \cdot Pp + As \cdot Ps = Tx \qquad (I).$$

Preferably, the tool driving control section 21 controls the tool driving section 53 such that the tool average position Tx is substantially 0.

Various information available to the tool driving control section 21 can be used as a reference point (0 point of the press-fit depth) of the press-fit depth Pp or Ps in the equation (I). For example, a predetermined position from the support surface 56a of the lining member 56 (refer to "tool distance" described later) can be set as the reference point of the press-fit depth. Specifically, a predetermined position based on the thickness of the object to be welded 60, which is inputted as a welding condition from the input section 32 shown in FIG. 4, may be set as the reference point of the press-fit depth, or a predetermined position based on a measured value of the thickness of the object to be welded 60 may be set as the reference point of the press-fit depth.

According to the present invention, the reference point of the press-fit depth is not limited to the predetermined position from the front surface 56a of the lining member 56, and may be a position where a load of the pin member 11 or the shoulder member 12 becomes a predetermined value, a position where the rotating tool 51 contacts the object to be welded 60 (refer to Embodiment 2 described later), or a position of the front end of the clamp member 54 in contact with the object to be welded 60 (refer to Embodiment 3 or 4 described later).

In the equation (I), at least one of the cross-section area Ap of the front end surface of the pin member 11, the cross-section area As of the front end surface of the shoulder member 12, the press-fit depth Pp of the pin member 11, and the press-fit depth Ps of the shoulder member 12 may be replaced with another numerical value or a parameter. For example, in this embodiment, since the lining member 56 is provided, the press-fit depth in the equation (I) may be replaced with the position from the front surface 56a of the lining member 56, and the tool driving control section 21 may control driving of the rotating tool 51 so as to make the absolute value of the tool average position Tx small, which is defined by the equation (I).

According to friction stir spot welding, following possible failures are known: a cavity in the welded portion stirred by the rotating tool 51, burrs protruding from a part of the material on the welded portion, a bump on a region pressed by the clamp member 54 (around the welded portion), or a gap in the stacked object to be welded 60 (in this embodiment, between the metal plates 61, 62). The tool driving control section 21 can control the tool driving section 53 so as to make the tool average position Tx small, thereby reducing or avoiding the various failures. Details of the control will be described later.

[Control by Tool Driving Control Section]

Next, control of the tool driving section 53 by the tool driving control section 21, in particular, controlling the position of the front ends of the pin member 11 and the shoulder member 12 so as to make the absolute value of the tool average position Tx small, will be specifically described with reference to FIG. 5.

According to the present invention, the tool driving control section 21 can control the tool driving section 53 so as to make the absolute value of the tool average position Tx small in the stage in which the pin member 11 and the shoulder member 12 contact the object to be welded 60, that is, the press-fit depth, the pressurizing force, or the both can be controlled as described above. Thus, the various failures including the cavity in the welded portion of the object to be welded 60, the burrs on the welded portion, the bump around the welded portion, or the gap in the object to be welded 60 can be effectively suppressed or prevented.

The control will be specifically described with reference to FIG. 5. Providing that the pin member 11 or the shoulder member 12 (or the both) is press-fitted into the object to be welded 60 with a preferable press-fit depth, and advancement and retraction of the pin member 11 or the shoulder member 12 (or the both) is preferably controlled, as shown in the left in FIG. 5 when viewed from the front, the object to be welded 60 can be properly welded without causing any failure in the object to be welded 60. In FIG. 5, for describing the press-fit depth of the rotating tool 51, the backfill stage in FIG. 2D or FIG. 3D is used as an example, and the press-fit depth of the pin member 11 or the shoulder member 12 is highlighted.

Figure 5:
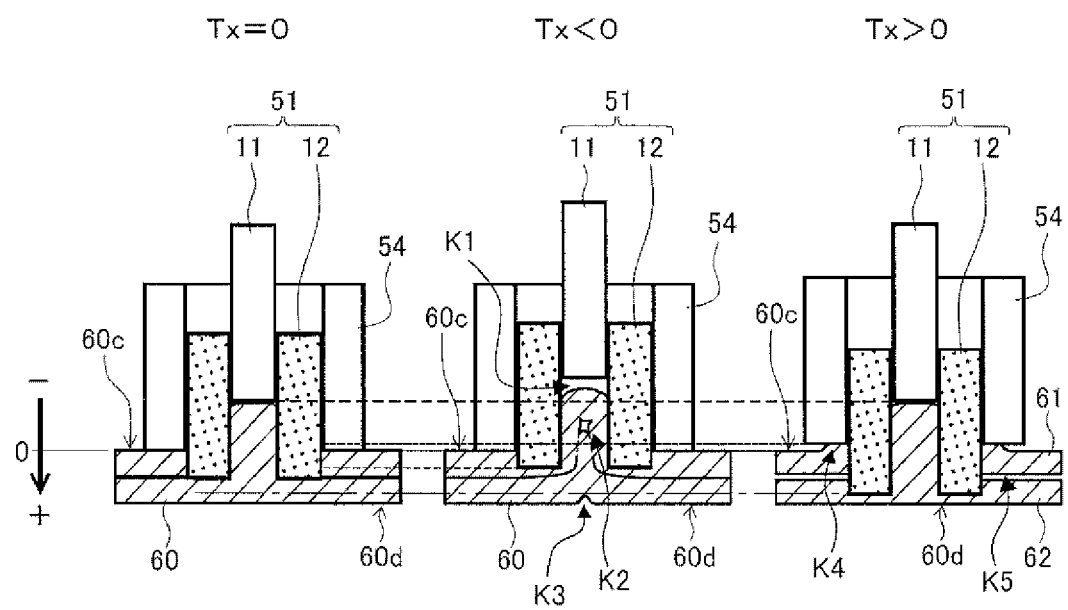
FIG. 5 is a schematic view showing a typical example of positional control of a pin member and a shoulder member in the friction stir spot welding device in FIG. 1, and a representative example of a failure.

However, as shown in the center in FIG. 5, when the press-fit depth of the pin member 11 or the shoulder member 12 (or the both) is insufficient, the pin member 11 or the shoulder member 12 (or the both) floats from the predetermined position (floating state). In the floating state, since the rotating tool 51 cannot sufficiently stir the object to be welded 60, the plastic flowing portion 60a (refer to FIG. 2B to FIG. 2E, FIG. 3B to FIG. 3E) cannot sufficiently flow according to advancement and retraction of the pin member 11 or the shoulder member 12. Accordingly, this may cause various failures such as a gap K1 between the pin member 11 and the object to be welded 60, a cavity K2 in the object to be welded 60, or a recess (dent) K3 in the back surface 60d of the object to be welded 60.

As shown in the right in FIG. 5 when viewed from the front, when the press-fit depth of the pin member 11 or the shoulder member 12 (or the both) is excessive, the pin member 11 or the shoulder member 12 (or the both) is over-pressed further than the predetermined position (over-pressed state). In the over-pressed state, since the object to be welded 60 escapes to the periphery of the rotating tool 51, that is, toward the clamp member 54, the rotating tool 51 is press-fitted further than the predetermined position. Accordingly, this may cause various failures such as a depression in the welded portion (clearly not shown in FIG. 5), a bump K4 on a region of the front surface 60c in contact with the clamp member 54, and a gap K5 in the object to be welded 60 (in this embodiment, between the metal plates 61, 62).

Although a control method of suppressing or preventing such failure has not been known so far, according to the present invention, the failure can be suppressed or prevented by controlling the rotating tool 51 so as to make the absolute value of the tool average position Tx small, which is defined according to the equation (I). The left-hand side (Ap·Pp+As·Ps) in the equation (I) represents addition of a product (a multiplication value) of the cross-section area and the press-fit depth of the pin member 11 and a product of the cross-section area and the press-fit depth of the shoulder member 12, and is defined as the "tool average position Tx" (Tx=Ap·Pp+As·Ps) in the equation (I). According to the present invention, the tool driving control section 21 only need to control the tool driving section 53 so as to make the absolute value of the tool average position Tx small, preferably, to set the tool average position Tx to substantially 0, as shown in the left in FIG. 5 when viewed from the front, that is, to substantially remain the tool average position Tx unchanged.

Given that the direction of press-fit of the pin member 11 and the shoulder member 12 (the downward direction in FIG. 5) is a "positive direction" (plus direction), in the floating state shown in the center in FIG. 5, the tool average position Tx becomes negative (Tx<0). As described above, in the floating state, stirring by the rotating tool 51 is insufficient. Thus, for the tool driving control section 21 to control the rotating tool 51 so as to achieve tool average position Tx=0, stirring may be promoted to solve lack of stirring. The control is not specifically limited, and examples of such control include, a1: decreasing the advancing or retracting speed of the pin member 11 (or the shoulder member 12), a2: increasing the load (pressurizing force) of the shoulder member 12 (or the pin member 11), or a3: changing the rotational speed of the rotating tool.

In the over-pressed state shown in the right in FIG. 5 when viewed from the front, the tool average position Tx becomes positive (Tx>0). In the over-pressed state, as described above, since a part of the fluidized material (the plastic flowing portion 60a) of the object to be welded 60 escapes toward the clamp member 54, escaping of the material should be suppressed or avoided. A main reason for escaping of the material is as follows: the material is more softened than expected because much heat is inputted to the object to be welded 60. Thus, for the tool driving control section 21 to control the rotating tool 51 so as to make the absolute value of the tool average position Tx small (preferably, to achieve the tool average position Tx=0), heat input may be reduced.

Control to reduce heat input is not specifically limited, and examples of such control include, b1: increasing the advancing or retracting speed of the pin member 11 (or the shoulder member 12), b2: decreasing the load (pressurizing force) on the shoulder member 12 (or the pin member 11), or b3: decreasing the rotational speed of the rotating tool 51. The method of suppressing or avoiding escaping of the material is not limited to the above-mentioned control method, and may be a physical approach of increasing the clamping force of the clamp member 54, preventing escaping of the material.

In summary, specific examples of the method of satisfying the tool average position Tx=0 by the tool driving control section 21 include, c1: control to adjust the advancing or retracting speed of the pin member 11 and the shoulder member 12 (a1 and b1 described above), c2: control to adjust the loads (pressurizing force) of the pin member 11 and the shoulder member 12 (a2 and b2 described above), or c3: control to adjust the rotational speed of the rotating tool 51, or any combination of two or more of them. The control c3 can be combined with at least one of c1 and c2.

In this embodiment, as specific control by the tool driving control section 21, following three examples are illustrated: Control example 1: the advancing or retracting speed of one member of the rotating tool 51 is adjusted, while the load of the other member of the rotating tool 51 is adjusted, specifically, the advancing or retracting speed of the pin member 11 is adjusted and the load of the shoulder member 12 is adjusted, or the advancing or retracting speed of the shoulder member 12 is adjusted and the load of the pin member 11 is adjusted (combination of the above-described controls c1 and c2), Control example 2: the advancing speed of both of the pin member 11 and the shoulder member 12 is adjusted (the above-described control c1), and Control example 3: the loads of both of the pin member 11 and the shoulder member 12 are adjusted (the above-described control c2). Using the three examples, control to make the absolute value of the tool average position Tx small will be described in detail.

The "tool average position Tx=0" as the most preferable control according to the present invention refers to the state where the tool average position Tx is substantially ±0 (Tx≈0), that is, the state where under control by the tool driving control section 21, Tx can be considered to 0 on the basis of the unit, significant digits, and other conditions of the cross-section area Ap of the pin member 11, the cross-section area As of the shoulder member 12, the press-fit depth Pp of the pin member 11, and the press-fit depth Ps of the shoulder member 12. Thus, depending on the various conditions such as the configuration and applications of the friction stir spot welding device 50A, the tool average position Tx need not be as small as 0, and as long as excellent control is possible, the absolute value of the tool average position Tx may be set to be the practically smallest value wherever possible.

CONTROL EXAMPLE 1

First, an example of Control example 1 will be specifically described with reference to FIG. 6. In Control example 1, in place of the advancing or retracting speed of one member of the rotating tool 51 (for example, the pin member 11), the load (pressurizing force) of the other member of the rotating tool 51 (for example, the shoulder member 12) may be adjusted, and further, the rotational speed of the rotating tool 51 may be adjusted. Therefore, the adjustable item in this control is not limited to one of the advancing or retracting speed, the load, and the rotational speed as described above, and may be plural. To describe that at least one item is adjustable, FIG. 6 shows adjustment of the advancing or retracting speed of the pin member 11 as an example, as well as adjustment of the rotational speed or the load in parentheses.

Figure 6:
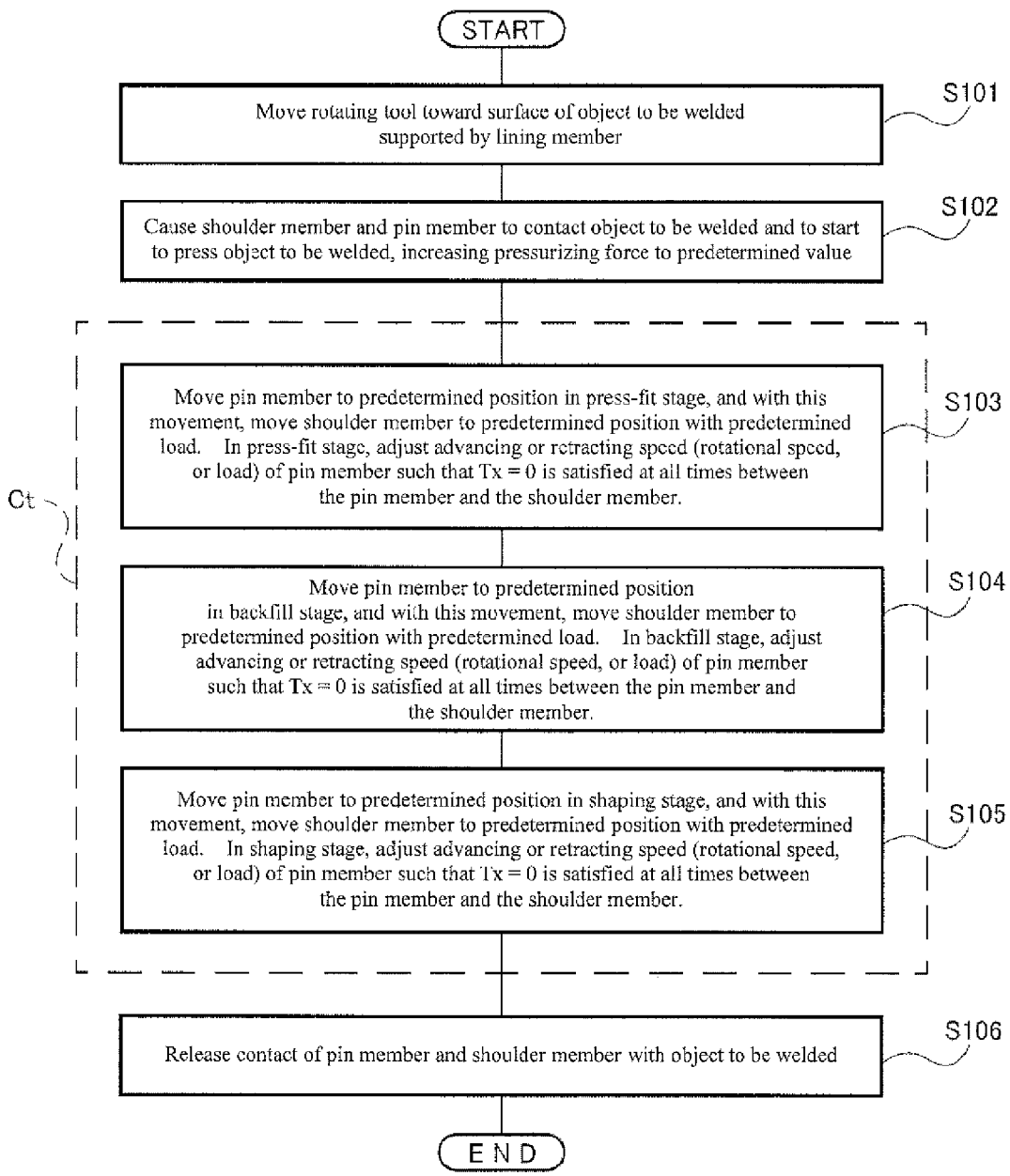
FIG. 6 is a flow chart showing an example of control of friction stir spot welding by the friction stir spot welding device in FIG. 4.

First, as shown in FIG. 6, the tool driving control section 21 controls the tool driving section 53 to cause the rotating tool 51 to move toward the front surface 60c of the object to be welded 60 supported by the lining member 56 (Step S101). Since this stage corresponds to the preparation stage (refer to FIG. 2A), the clamp member 54 contacts the front surface 60c.

Next, the tool driving control section 21 causes the shoulder member 12 and the pin member 11 to contact the front surface 60c of the object to be welded 60 and to start to press (push) down the object to be welded 60, increasing the load (pressurizing force) to a predetermined value (Step S102). At this time, although the shoulder member 12 contacts the front surface 60c while rotating, the shoulder member 12 may contact the front surface 60c without rotating and then, may start to rotate after contact.

Next, the tool driving control section 21 moves the pin member 11 to a predetermined position in the press-fit stage, and with this movement, moves the shoulder member 12 to a predetermined position with a predetermined load (Step S103). That is, since this stage corresponds to the press-fit stage (refer to FIG. 2B and FIG. 2C), the tool driving control section 21, in the press-fit stage, adjusts the advancing or retracting speed (the rotational speed, or the load) of the pin member 11 such that the absolute value of the tool average position Tx is made small at all times between the pin member 11 and the shoulder member 12, for example, Tx is 0 at all times.

Next, the tool driving control section 21 moves the pin member 11 to a predetermined position in the backfill stage, and with this movement, moves the shoulder member 12 to a predetermined position with a predetermined load (Step S104). That is, since this stage corresponds to the backfill stage (refer to FIG. 2D), the tool driving control section 21 adjusts, in the backfill stage, the advancing or retracting speed (the rotational speed, or the load) of the pin member 11 such that the tool average position Tx is 0 at all times between the pin member 11 and the shoulder member 12. As described above, the backfill stage may be omitted.

Next, the tool driving control section 21 moves the pin member 11 to a predetermined position in the shaping stage, and with this movement, moves the shoulder member 12 to a predetermined position with a predetermined load (Step S105). That is, since this stage corresponds to the shaping stage (refer to FIG. 2E), the tool driving control section 21, in the shaping stage, adjusts the advancing or retracting speed (the rotational speed, or the load) of the pin member 11 such that the tool average position Tx is 0 at all times between the pin member 11 and the shoulder member 12.

As described above, in the Steps S103 to S105 surrounded with a broken line Ct in FIG. 6, the tool driving control section 21 controls the tool driving section 53 such that the absolute value of the tool average position Tx is kept small at all times. After that, the tool driving control section 21 releases contact of the pin member 11 and the shoulder member 12 with the object to be welded 60 (Step S106) to finish a series of control of friction stir spot welding.

CONTROL EXAMPLE 2

Figure 7:
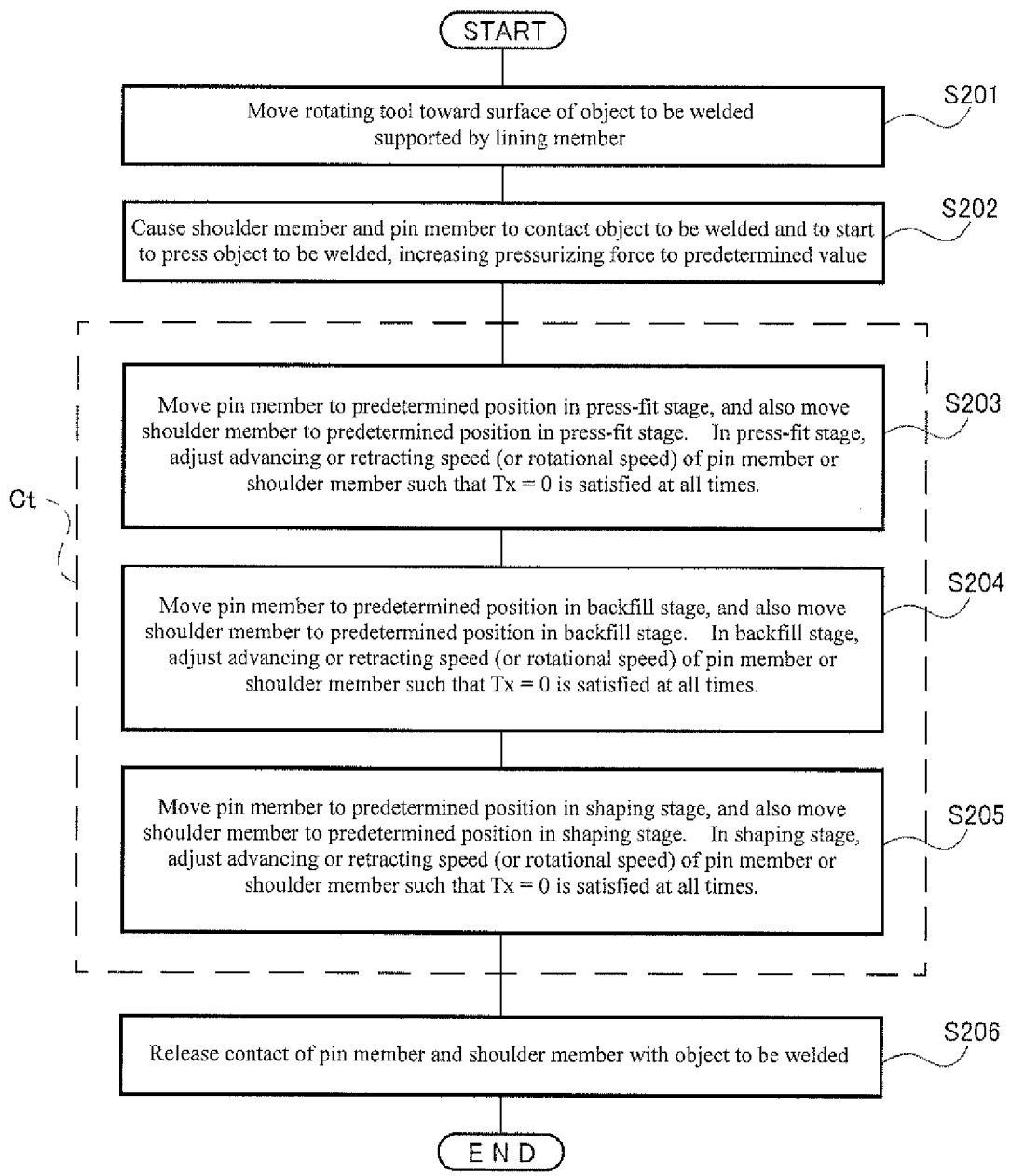
FIG. 7 is a flow chart showing another example of control of friction stir spot welding by the friction stir spot welding device in FIG. 4.

Next, an example of Control example 2 will be specifically described with reference to FIG. 7. FIG. 7 shows adjustment of the advancing or retracting speed, as well as adjustment of the rotational speed in parentheses.

As shown in FIG. 7, the tool driving control section 21 controls the tool driving section 53 to cause the rotating tool 51 to move toward the front surface 60c of the object to be welded 60 (Step S201), and the rotating tool 51 to contact the front surface 60c to start pressing (pushing), increasing the load (pressurizing force) to a predetermined value (Step S202).

Next, the tool driving control section 21 moves the pin member 11 and the shoulder member 12 to respective predetermined positions in the press-fit stage (Step S203), and then, moves the pin member 11 and the shoulder member 12 to respective predetermined positions in the backfill stage (Step S204), and moves the pin member 11 and the shoulder member 12 to respective predetermined positions in the shaping stage (Step S205).

At this time, the tool driving control section 21 adjusts the advancing or retracting speed (the rotational speed, or both of the advancing or retracting speed and the rotational speed) of the pin member 11 or the shoulder member 12 such that the absolute value of the tool average position Tx is made small at all times (for example, Tx=0 at all times) in all of the press-fit stage, the backfill stage, and the shaping stage (Steps S203 to S205 surrounded with a broken line Ct in FIG. 7). After that, the tool driving control section 21 releases contact of the pin member 11 and the shoulder member 12 with the object to be welded 60 (Step S206) to finish a series of control of friction stir spot welding.

CONTROL EXAMPLE 3

Figure 8:
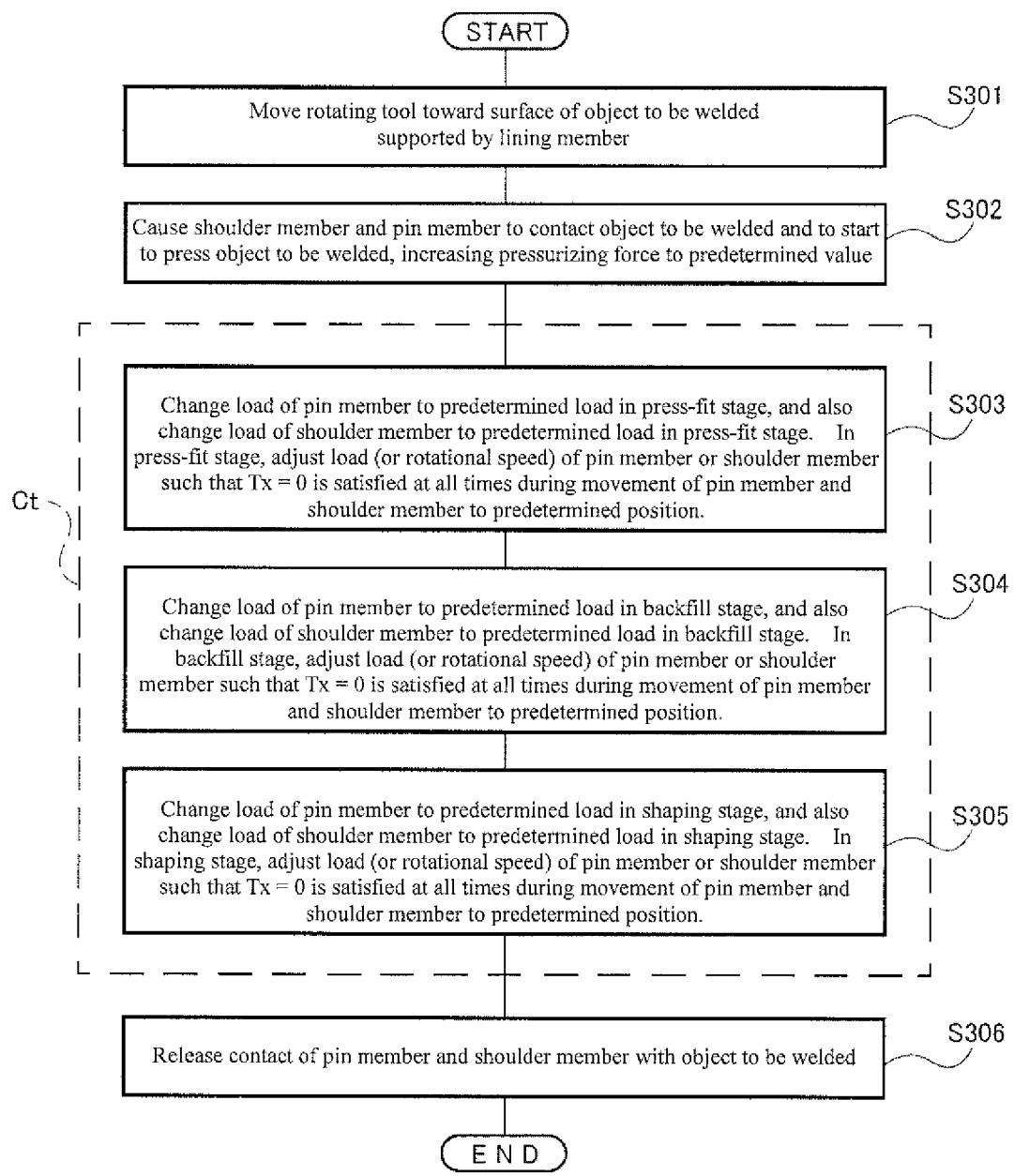
FIG. 8 is a flow chart showing still another example of control of friction stir spot welding by the friction stir spot welding device in FIG. 4.

Next, an example of Control example 3 will be specifically described with reference to FIG. 8. FIG. 8 also shows adjustment of the load, as long as adjustment of the rotational speed in parentheses.

As shown in FIG. 8, tool driving control section 21 controls the tool driving section 53 to cause the rotating tool 51 to move toward the front surface 60c of the object to be welded 60 (Step S301), and the rotating tool 51 to contact the front surface 60c to start pressing (pushing), and sets the load (pressurizing force) such that the rotating tool 51 is press-fitted into the object to be welded 60 (Step S302).

Next, the tool driving control section 21 changes loads of the pin member 11 and the shoulder member 12 to respective predetermined loads in the press-fit stage (Step S303), then, to respective predetermined loads in the backfill stage (Step S304), and then, to respective predetermined loads in the shaping stage (Step S305).

At this time, the tool driving control section 21 adjusts the load (the rotational speed, or both of the load and the rotational speed) of the pin member 11 or the shoulder member 12 such that the absolute value of the tool average position Tx is made small at all times (for example, Tx=0 at all times) in all of the press-fit stage, the backfill stage, and the shaping stage (Steps S303 to S305 surrounded with a broken line Ct in FIG. 8). After that, the tool driving control section 21 releases contact of the pin member 11 and the shoulder member 12 with the object to be welded 60 (Step S306) to finish a series of control of friction stir spot welding.

The predetermined value of the pressurizing force, the predetermined position and the predetermined load (pressurizing force) of the pin member 11 or the shoulder member 12 in Control examples 1 to 3 are set according to various conditions, for example, the specific configuration of the friction stir spot welding device 50A, and material, thickness, and shape of the object to be welded 60. The predetermined value, the predetermined position, and the predetermined load are inputted to the tool driving control section 21 by the input section 32, and are stored in the memory section 31. The tool driving control section 21 reads the information according to the control stage from the memory section 31, and uses the read information.

[Control of Advancing or Retracting Speed, and Pressurizing Force]

In Control examples 1 to 3, advancement or retraction of the shoulder member 12 and the pin member 11 to the respective predetermined positions is controlled based on a value of a current applied to a motor of the tool driving section 53 (motor current value). For the shoulder member 12, the shoulder member 12 is controlled based on the motor current value, and when the shoulder member 12 reaches the predetermined position, advancement or retraction is finished. Therefore, the advancing or retracting speed is controlled by adjusting the motor current value. This is also applied to the rotational speed. The advancement or retraction of the shoulder member 12 and the pin member 11 to the respective predetermined positions may be controlled by any means other than the motor, for example, air pressure.

The load (pressurizing force) is adjusted, as shown in FIG. 4, by reading below-mentioned pressurizing force adjusting data from the memory section 31 by the tool driving control section 21. The pressurizing force adjusting data may be any data that can be used to control the tool driving section 53, preferably, data for adjusting the pressurizing force at least in the state where the rotating tool 51 is press-fitted into the object to be welded 60.

In this embodiment, the data is the above-mentioned motor current value. The motor current value is written in the form of database (or table) so as to address with change in the pressurizing force, and as described above, the pressurizing force/motor current databases Db1 to Db3 are stored in the memory section 31. The tool driving control section 21 reads the current value and adjusts the motor current value, thereby controlling the pressurizing force of the pin member 11 and the shoulder member 12.

Especially in this embodiment, the number of the databases (or tables) for the motor current value, which are stored in the memory section 31, is three, not one. The pressurizing force/motor current database Db1 contains the motor current values for advancing or retracting the shoulder member 12 when advancement and retraction of the pin member 11 is stopped, the pressurizing force/motor current database Db2 contains the motor current values for advancing or retracting the shoulder member 12 when the pin member 11 is press-fitted into (pushed into) the object to be welded 60, and the pressurizing force/motor current database Db3 contains the motor current values for advancing or retracting the shoulder member 12 when the pin member 11 is pulled out of the object to be welded 60.

The tool driving control section 21 determines whether the pin member 11 is press-fitted, is pulled out, or is stopped without being press-fitted or pulled out, and reads the motor current value in the corresponding action from the three pressurizing force/motor current databases Db1 to Db3 to control the tool driving section 53. In the state where the object to be welded 60 is pressed, the pressurizing force changes according to the action of the pin member 11. Thus, by adjusting the pressurizing force according to the action of the pin member 11, the pressurizing force can be controlled more suitably.

Specifically, providing that the state where the pin member 11 is stopped (at stopping) is a reference state, in the state where the pin member 11 is press-fitted (at press-fit action), the pressurizing force becomes relatively high, and in the state where the pin member 11 is pulled out (at pull-out action), the pressurizing force becomes relatively low. Accordingly, at press-fit, pull-out, and stopping of the pin member 11, different motor current values are written in databases and stored in the memory section 31. The tool driving control section 21 determines the type of the action of the pin member 11, for example, on the basis of the moving speed and the moving direction of the pin member 11, and reads the motor current value corresponding to the determined action to adjust the pressurizing force.

The motor current values stored in the pressurizing force/motor current databases Db1 to Db3 are not specifically limited, and experimentally suitable values may be derived according to the type of the motor of the tool driving section 53, the change amount in the pressurizing force, the type of a gear mechanism transmitting the rotation driving power, or so on, and be written in databases (or tables). Only two databases may be stored, or four or more databases may be stored as needed.

In this embodiment, the moving speed and the moving direction of the pin member 11 are used as indicators for determining the type of the action of the pin member 11. However, the indicators are not limited to the moving speed and the moving direction, and may be any well-known parameter as long as it can properly determine the press-fit action, pull-out action, and stopping action. When the moving speed of the pin member 11 is used as the indicator, a speed deadband at switching between the press-fit action and the pull-out action can be set.

Provided that the state where the pin member 11 moves at a speed exceeding 0.05 mm/s determined as the press-fit action (+ direction) or the pull-out action (− direction) on the basis of the moving direction, the range of −0.05 to +0.05 mm/s set as the deadband. As a result, since the boundary for determining the press-fit action or the pull-out action is no longer a pinpoint threshold, the possibility that the database to be read frequently changes with speed change, leading to unstable adjustment of the pressurizing force can be suppressed or prevented.

As described above, the friction stir spot welding device 50A in accordance with this embodiment can preferably control the positional relationship of the front ends of the pin member 11 and the shoulder member 12 such that the absolute value of the tool average position Tx, which is defined by the equation (I), is made small (preferably, the tool average position Tx is substantially 0), and in particular, can effectively suppress or prevent failures such as the internal cavity defect in the welded portion of the object to be welded 60, burrs on the welded portion, the bump around the welded portion, and the gap in the object to be welded 60. Accordingly, excellent welding quality can be achieved at high accuracy according to welding conditions.

(Embodiment 2)

Figure 9:
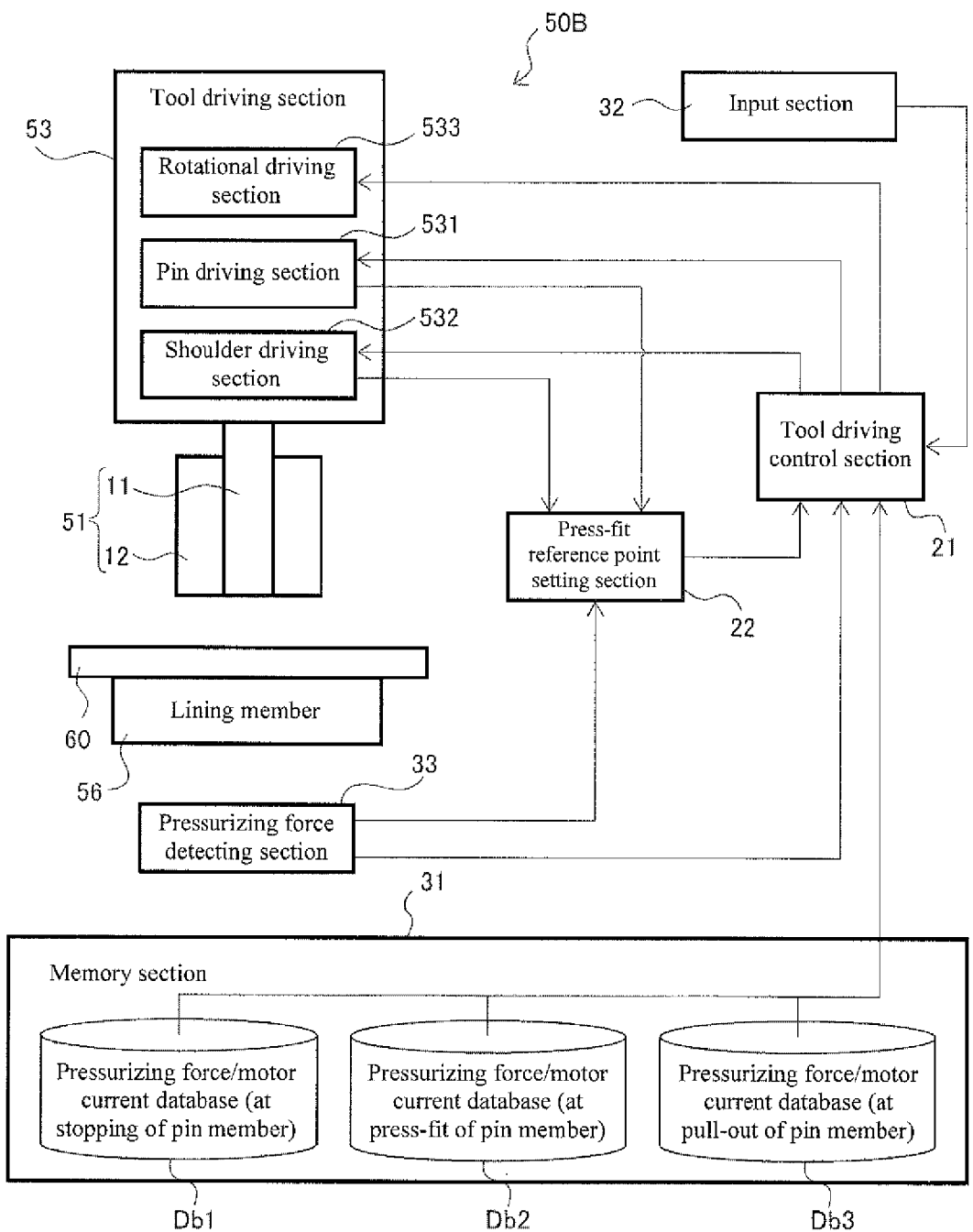
FIG. 9 is a block diagram showing functional configuration of a friction stir spot welding device in accordance with Embodiment 2 of the present invention.

A configuration of a friction stir spot welding device in accordance with Embodiment 2 of the present invention will be specifically described with reference to FIG. 9 and FIGS. 10A and 10B. As shown in FIG. 9, a friction stir spot welding device 50B in accordance with this embodiment is the same as the friction stir spot welding device 50A in Embodiment 1 in basic configuration, but is different from the friction stir spot welding device 50A in that it includes a press-fit reference point setting section 22.

The press-fit reference point setting section 22 serves to set the position where the pin member 11 or the shoulder member 12 contacts the object to be welded 60, as the press-fit (pressing) reference point of the pin member 11 or the shoulder member 12. As described above, the pin member 11 or the shoulder member 12 stays on the front surface 60c of the object to be welded 60 for a short but certain period until the material becomes softened. Then, for the shoulder member 12, the press-fit reference point setting section 22 derives the position where the shoulder member 12 contacts the object to be welded 60 and stays there for a certain period from positional information of the shoulder member 12 (such as the moving speed obtained by an encoder), which is obtained from the tool driving control section 21, and sets the derived position as a press-fit reference point. The press-fit reference point becomes a reference point for the press-fit depth at press-fit of the pin member 11 and the shoulder member 12 into the object to be welded 60. The press-fit reference point for the pin member 11 is set in the same manner.

As a matter of course, the press-fit reference point setting section 22 may set the position offset from the front surface 56a of the lining member 56 by a nominal or pre-measured thickness of the object to be welded 60, as the press-fit reference point, and in this case, operations of measuring and inputting the thickness are required. When the position offset from the front surface 56a of the lining member 56 by the nominal or pre-measured thickness of the object to be welded 60 is set as the press-fit reference point, since the pin member 11 or the shoulder member 12 contacts the material with considerable pressurizing force, it is necessary to consider deformation of the friction stir spot welding device 50A due to the pressurizing force. Further, deviation in length, which is caused by thermal expansion of the pin member 11 and the shoulder member 12 during preheating, can occur as an error. When the position where the shoulder member 12 (rotating tool 51) contacts the object to be welded 60 and stays there for a certain period is set as the press-fit reference point, deformation of the friction stir spot welding device 50A, deformation of the object to be welded 60, and deviation in length due to thermal expansion of the pin member 11 and the shoulder member 12 can be eliminated.

The configuration of the press-fit reference point setting section 22 is not specifically limited, and as long as it can set the press-fit reference point on the basis of the motor rotational information (for example, motor rotational angle or rotational speed) generated by the tool driving control section 21, it may be a function of the tool driving control section 21, or may be configured as a well-known logical circuit or like including a switching element, a subtractor, or a comparator, etc.

Control of the press-fit depth of the pin member 11 and the shoulder member 12 by the tool driving control section 21 will be described with reference to FIG. 10A and FIG. 10B. For example, as shown in FIG. 10A, the object to be welded 60 is supported by the lining member 56, the front end of the pin member 11 is aligned with the front end of the shoulder member 12, and a spacing De occurs between the front surface 60c of the object to be welded 60 and the front ends of the pin member 11 and the shoulder member 12. Given that a distance between the front end of the rotating tool 51 (the pin member 11 and the shoulder member 12) and the support surface 56a of the lining member 56 is "tool distance", in the state shown in FIG. 10A, a tool distance Dt0 includes the spacing De.

It is assumed that the pin member 11 or the shoulder member 12 is press-fitted to a press-fit depth d0. At this time, the spacing De does not contribute to control of the press-fit depth d0. Then, as shown in FIG. 10B, when the shoulder member 12 advances and contacts the front surface 60c of the object to be welded 60 and stays there for a certain period, the press-fit reference point setting section 22 sets the position of the tool distance Dt1 in FIG. 10B as the press-fit reference point. That is, the press-fit reference point setting section 22 corrects the position where the shoulder member 12 contacts and stays to a point of press-fit depth=0 (0 point), and using the 0 point as a reference, the tool driving control section 21 controls advancement or retraction of the pin member 11 (or the shoulder member 12 or the both).

In the example shown in FIG. 10B, the tool driving control section 21 may press the pin member 11 from the reference point (the position of Dt1) by d0 without consideration of the spacing De. Therefore, the press-fit reference point setting section 22 makes 0-point correction of the press-fit, thereby avoiding complicated control of the press-fit depth and controlling the press-fit depth without consideration of the spacing De. Accordingly, the press-fit depth can be controlled more accurately.

By controlling the press-fit depth more accurately in this manner, the final press-fit depth of the rotating tool 51 (the pin member 11, the shoulder member 12, or the both) can be accurately controlled. Moreover, according to the present invention, while the rotating tool 51 is advanced or retracted, the tool driving control section 21 performs control such that the absolute value of the tool average position Tx is made small (preferably, tool average position Tx=0) at all times. Accordingly, failures such as the internal cavity defect in the welded portion of the object to be welded 60, burrs on the welded portion, the bump around the welded portion, and the gap in the object to be welded 60 can be suppressed or prevented more effectively.

As shown in FIG. 10B, the tool distance Dt1 subjected to 0-point correction by the press-fit reference point setting section 22 corresponds to the thickness of the object to be welded 60. Accordingly, the friction stir spot welding device 50B in this embodiment can cause the shoulder member 12 to contact the object to be welded 60 for 0-point correction, thereby measuring the thickness of the object to be welded 60.

(Embodiment 3)

Figure 11:
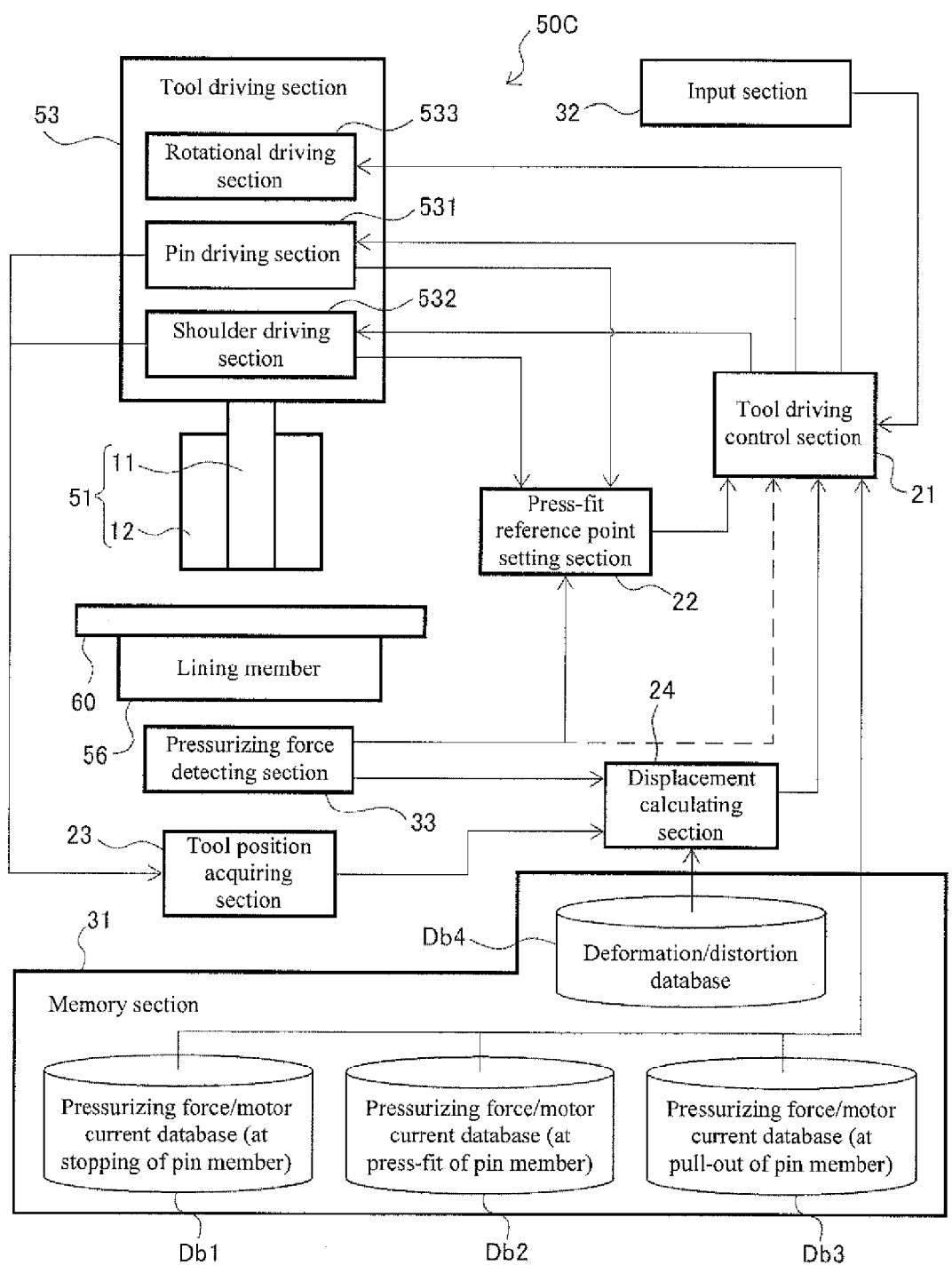
FIG. 11 is a block diagram showing functional configuration of a friction stir spot welding device in accordance with Embodiment 3 of the present invention.

A configuration of a friction stir spot welding device in accordance with Embodiment 3 of the present invention will be specifically described with reference to FIG. 11. As shown in FIG. 11, a friction stir spot welding device 50C in this embodiment is the same as the friction stir spot welding device 50A in Embodiment 1 in basic configuration, but is different from the friction stir spot welding device 50A in that a tool position acquiring section 23 and a displacement calculating section 24 are provided, and a deformation/distortion database Db4 is stored in the memory section 31.

The tool position acquiring section 23 acquires a tool position from the pin driving section 531 and the shoulder driving section 532. The tool position is a position of the front end of the pin member 11 or the front end of the shoulder member 12, and the tool driving control section 21 generates the tool distance based on the tool position. As described in Embodiment 1 (refer to FIG. 10A and FIG. 10B), the tool distance is defined as a distance between the front end of the pin member 11 or the front end of the shoulder member 12, and the support surface 56a.

The displacement calculating section 24 calculates various types of displacement (quantity of displacement), which affects advancement or retraction of the rotating tool 51, from the pressurizing force detected by the pressurizing force detecting section 33. Examples of the quantity of displacement includes quantity of displacement of the rotating tool, quantity of deformation of the lining support section 55, and quantity of distortion of the tool fixing section 52 and the tool driving section 53. However, the quantity of displacement is not limited to these, and may be backlash of the tool driving section 53. In this embodiment, the displacement calculating section 24 reads the quantity of displacement corresponding to the pressurizing force from the deformation/distortion database Db4 stored in the memory section 31.

In this embodiment, the pin driving section 531 and the shoulder driving section 532 each are formed of a well-known motor. The tool position acquiring section 23 can acquire the tool position by use of an encoder or the like provided in the motor, and the displacement calculating section 24 can calculate tool quantity of displacement on the basis of the pressurizing force acquired by the pressurizing force detecting section 33, and the deformation/distortion database Db4 recorded in the memory section 31. The tool driving control section 21 generates the tool distance based on the tool position, and corrects the tool distance according to the tool quantity of displacement.

The quantity of displacement of the rotating tool is defined as displacement between the thickness of the object to be welded 60, which is inputted as the welding condition, and the position of the contact surface 12a at the time when the pin member 11 or the shoulder member 12 contacts the front surface 60c of the object to be welded 60, in the state where the support surface 56a of the lining member 56 supports the object to be welded 60 (the stacked metal plates 61, 62). The position of the front end of the pin member 11 or the shoulder member 12 at the time when the pin member 11 or the shoulder member 12 contacts the front surface of the object to be welded 60 can be acquired by using the above-mentioned encoder (the shoulder driving section 532). Occurrence of the quantity of displacement of the rotating tool affects control of the position of the front end of the pin member 11 or the shoulder member 12.

The quantity of deformation of the lining support section 55 is degree of deformation generated by bringing the rotating tool 51 into contact with the object to be welded 60 and press-fitting the rotating tool 51 into the object to be welded 60 to push the front surface 60c of the object to be welded 60. When deformation occurs in the lining support section 55, the relative position of the support surface 56a of the lining member 56 changes according to the quantity of deformation. The front surface 60c of the object to be welded 60, which is supported by the support surface 56a, is also displaced, affecting control of the press-fit depth of the pin member 11 and the shoulder member 12.

The quantity of distortion of the tool fixing section 52 and the tool driving section 53 is degree of distortion of members, parts, or mechanisms that constitute the tool fixing section 52 and the tool driving section 53, and is generated by reaction against a force of pressing the front surface 60c of the object to be welded 60 when the rotating tool 51 contacts and is press-fitted into the object to be welded 60. When distortion occurs in the tool fixing section 52 and the tool driving section 53, the position of the front ends of the pin member 11 and the shoulder member 12 changes according to the quantity of distortion, affecting control of the press-fit depth of the pin member 11 and the shoulder member 12.

The displacement calculating section 24 calculates the quantity of displacement on the basis of the welding condition inputted from the input section 32, positional information on the rotating tool 51, which is inputted from the pin driving section 531 and the shoulder driving section 532, etc., and the deformation/distortion database Db4 stored in the memory section 31, etc. The tool driving control section 21 corrects the tool distance on the basis of the quantity of displacement calculated by the displacement calculating section 24 and then, controls the tool driving section 53. The press-fit depth of the rotating tool 51 (the pin member 11, the shoulder member 12, or the both) with respect to the object to be welded 60 can be preferably controlled.

The configuration of the tool position acquiring section 23 and the displacement calculating section 24 is not specifically limited, and in this embodiment, as long as the tool driving control section 21 is formed of the CPU in the microcomputer as described above, the tool position acquiring section 23 and the displacement calculating section 24 may be functions of the tool driving control section 21. That is, the CPU as the tool driving control section 21 operates according to a program stored in the memory section 31 or another memory section to realize the tool position acquiring section 23 and the displacement calculating section 24. Alternatively, the tool position acquiring section 23 and the displacement calculating section 24 may be configured as a well-known logical circuit or like including a switching element, a subtractor, or a comparator, etc.

Providing that the object to be welded 60 is supported by the support surface 56a of the lining member 56, in the friction stir spot welding device 50C in this embodiment, the press-fit reference point setting section 22 can set the press-fit reference point to suitably control the press-fit depth of the pin member 11 and the shoulder member 12. Providing that the object to be welded 60 is not supported, the tool position acquiring section 23 can acquire the tool distance that is the difference between the front end of the pin member 11 or the shoulder member 12 and the support surface 56a, and if quantity of displacement occurs, the displacement calculating section 24 can calculate the quantity of displacement and corrects the tool distance to suitably control the press-fit depth of the pin member 11 and the shoulder member 12. Even when the quantity of displacement can affect control of the press-fit depth based on the press-fit reference point, by correcting the tool distance acquired by the tool position acquiring section 23 according to the quantity of displacement, the press-fit depth can be suitably controlled.

The press-fit depth can be controlled more accurately in this manner, thereby accurately controlling the final press-fit depth of the rotating tool 51 (the pin member 11, the shoulder member 12, or the both). Moreover, according to the present invention, while the rotating tool 51 is advanced or retracted, the tool driving control section 21 performs control such that the absolute value of the tool average position Tx is made small (preferably, tool average position Tx=0) at all times. Accordingly, failures such as the internal cavity defect in the welded portion of the object to be welded 60, burrs on the welded portion, the bump around the welded portion, and the gap in the object to be welded 60 can be suppressed or prevented more effectively.

In this embodiment, although not shown, the position of a front end of the clamp member 54 may be detected, and a clamp-tool distance as a distance between the front end of the clamp member 54 and the front end of the pin member 11 or the shoulder member 12 may be calculated to control the press-fit depth. The clamp member 54 is located outside the shoulder member 12 as described above, and serves to press the front surface 60c of the object to be welded 60. Therefore, as long as the clamp member 54 presses the object to be welded 60, the position of the front end of the clamp member 54 can be deemed to correspond to the front surface 60c of the object to be welded 60. Accordingly, the tool driving control section 21 can also correct quantity of displacement such as quantity of displacement of shoulder or quantity of deformation according to the clamp-tool distance.

Here, the configuration for calculating the clamp-tool distance may include a clamp position-rotating tool position detecting section using a well-known position sensor capable of detecting the position of the front end of the clamp member 54, and a clamp-tool distance calculating section that calculates the distance between the front end of the clamp member 54, which is detected by the clamp position-rotating tool position detecting section, and the front end of the pin member 11 or the shoulder member 12. The configuration of the clamp-tool distance calculating section is not specifically limited, and may be a function of the tool driving control section 21, or well-known logical circuit or like including a switching element, a subtractor, or a comparator, etc.

In this embodiment, the tool driving control section 21 may control driving of the rotating tool 51 by the output from the press-fit reference point setting section 22, the output from the displacement calculating section 24, and reading data of the pressurizing force/motor current databases Db1 to Db3 in the memory section 31, or as represented by a broken arrow in FIG. 11, by using the pressurizing force sent from the pressurizing force detecting section 33.

In the friction stir spot welding device 50C in this embodiment, the press-fit reference point setting section 22 can set the press-fit reference point to suitably control the press-fit depth of the pin member 11 and the shoulder member 12. This effect is the same as that in Embodiment 1. However, even when quantity of displacement such as quantity of displacement of the rotating tool, quantity of deformation of the lining support section 55, quantity of distortion of the tool fixing section 52 and the tool driving section 53, and backlash of the tool driving section 53 is present, the press-fit depth can be suitably controlled by correcting the tool distance acquired by the tool position acquiring section 23 with the quantity of displacement.

By correcting the tool distance with the quantity of displacement of the rotating tool, which is one of the quantity of displacement, the possibility that the rotating tool 51 penetrates the object to be welded 60 (hole) can be prevented or suppressed. As described in Embodiment 1, in the friction stir spot welding devices 50A to 50C, since the recess generated due to press-fit of the rotating tool 51 can be backfilled and shaped, such hole can be also backfilled. Nevertheless, it is desirable to avoid the hole as far as possible. When the press-fit reference point is greatly shifted due to the quantity of displacement of the rotating tool, the hole can occur. In this embodiment, however, the tool driving control section 21 can correct the tool distance with the quantity of displacement to prevent or suppress the hole.

(Embodiment 4)

Figure 12:
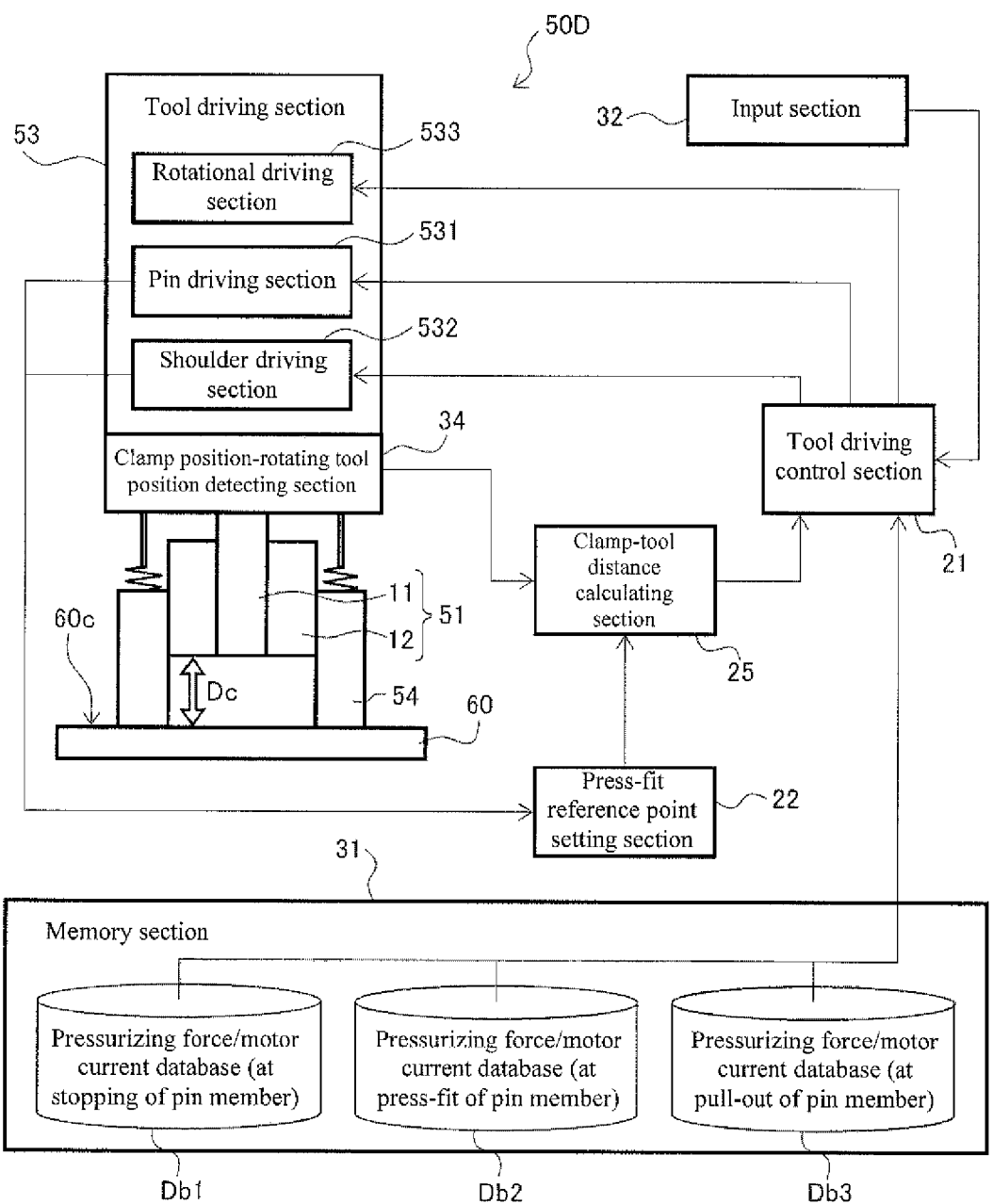
FIG. 12 is a block diagram showing functional configuration of a friction stir spot welding device in accordance with Embodiment 4 of the present invention.

A configuration of a friction stir spot welding device in Embodiment 4 of the present invention will be specifically described with reference to FIG. 12. As shown in FIG. 12, a friction stir spot welding device 50D in accordance with this embodiment is the same as the friction stir spot welding device 50C in Embodiment 3 in that the position of the front end of the clamp member 54 is detected to calculate the clamp-tool distance, but is different from the friction stir spot welding device 50C in that no the lining member 56 is provided, and no the pressurizing force detecting section 33 is provided.

Specifically, the friction stir spot welding device 50D includes a clamp position-rotating tool position detecting section 34 and a clamp-tool distance calculating section 25, but does not include the lining member 56 and the pressurizing force detecting section 33. As described in Embodiment 3, the clamp position-rotating tool position detecting section 34 detects the position of the front end of the clamp member 54. The clamp-tool distance calculating section 25 calculates a clamp-tool distance Dc represented by a block arrow in FIG. 12.

When the lining member 56 cannot support the back surface 60d of the object to be welded 60, for example, when a part of a three-dimensional structure is welded and thus, there is no space for the lining member 56, the lining member 56 cannot be used. When the object to be welded 60 has a sufficient stiffness, a lining may be unnecessary. Even in these cases, the present invention can be preferably applied.

In the example shown in FIG. 12, in the friction stir spot welding device 50D, in the state where the clamp member 54 contacts the object to be welded 60, the tool driving control section 21 controls advancement or retraction and the press-fit depth of the rotating tool 51 (the pin member 11 and the shoulder member 12) on the basis of the clamp-tool distance Dc. The tool driving control section 21 controls the rotating tool 51 such that the absolute value of the tool average position Tx is made small (preferably, tool average position Tx=0) at all time while the rotating tool 51 is advanced or retracted. Accordingly, failures such as the internal cavity defect in the welded portion of the object to be welded 60, burrs on the welded portion, the bump around the welded portion, and the gap in the object to be welded 60 can be suppressed or prevented more effectively. Even when the pressurizing force detecting section 33 is not provided, the pressurizing force can be adjusted by previously storing pressurizing force adjusting data in the memory section 31.

The present invention is not limited to the embodiments, and can be variously modified within the scope of Claims. Embodiments obtained by appropriately combining the technical means disclosed in the different embodiments and the modified examples also fall within the technical scope of the present invention.

Many modifications and other embodiments of the present invention will be apparent to those skilled in the art from the above description. Therefore, the above description should be interpreted to be only illustrative, and serves to teach the best mode for carrying out the present invention to those skilled in the art. Details of the configuration and/or function can be substantially changed without deviating from the spirit of the present invention.

Industrial Applicability

The present invention can suitably control the position of the pin member and the shoulder member especially in double-acting friction stir spot welding and therefore, can be applied to various fields using friction stir spot welding widely and preferably.

DESCRIPTION OF REFERENCE SIGNS

11: Pin member
12: Shoulder member
21: Tool driving control section
22: Press-fit reference point setting section
23: Tool position acquiring section
24: Displacement calculating section
31: Memory section
50A, 50B, 50C, 50D: Friction stir spot welding device
51: Rotating tool
53: Tool driving section
55: Lining support section
60: Object to be welded

The invention claimed is:

1. A method for friction stir spot welding comprising contacting an object to be welded with:
   a cylindrical pin member as a rotating tool configured to rotate about an axis and be advanceable and retractable in the axial direction, and
   a tubular shoulder member configured to surround the pin member, rotate coaxially with the pin member, and be advanceable and retractable in the axial direction;
   wherein:
   the object to be welded has a front surface facing the pin member and the shoulder member;
   the pin member and/or the shoulder member are configured to advance and retract to be brought into contact with the front surface of the object to be welded and to adjust a press-fit depth of the pin member and/or the shoulder member from the front surface of the object to be welded; and
   the pin member and the shoulder member are configured during the entire welding process so that a cross-sectional area of a front end surface of the pin member times a distance the pin member advances or retracts from the front surface of the object to be welded is substantially equal to a cross-sectional area of a front end surface of the shoulder member times a distance the shoulder member retracts or advances from the front surface of the object to be welded.

2. The method according to claim 1, further comprising setting a press-fit reference point at a position where the pin member or the shoulder member contacts the object to be welded, and controlling the press-fit depth of the shoulder member or the pin member on the basis of the press-fit reference point.

3. The method according to claim 1, further comprising calculating an amount of displacement of a front end of the pin member or the shoulder member, and correcting the press-fit depth with the amount of displacement.

4. The method according to claim 1, further comprising controlling the advancement and retraction of the pin member and the shoulder member by adjusting at least one of an advancing or retracting speed of the rotating tool, a load of the rotating tool, and a rotational speed of the rotating tool.

5. The friction stir spot welding method according to claim 2, wherein the press-fit reference point is set as the position where the pin member or the shoulder member contacts a front surface of the object to be welded in a state in which the pin member or the shoulder member is applying a pressurizing force to the object to be welded in a pre-heating stage.

* * * * *